United States Patent
Wada et al.

[11] Patent Number: 5,868,620
[45] Date of Patent: Feb. 9, 1999

[54] MULTIDIRECTIONAL SWITCH AND A DRIVING GAME MACHINE USING THE SAME

[75] Inventors: Tetsuya Wada, Kakogawa; Hiroyasu Machiguchi, Kobe; Satoshi Uchiyama, Kobe; Takahiro Hiraoka, Kobe, all of Japan

[73] Assignee: Konami Co., Ltd., Hyogo-ken, Japan

[21] Appl. No.: 709,919

[22] Filed: Sep. 9, 1996

[30] Foreign Application Priority Data

Sep. 12, 1995 [JP] Japan ................................. 7-234382
Nov. 8, 1995 [JP] Japan ................................. 7-2900065

[51] Int. Cl.$^6$ ........................................................ G09G 5/00
[52] U.S. Cl. .................................................................. 463/38
[58] Field of Search ................................. 463/36, 37, 38; 345/161, 167, 168; 200/6 A, 651.52; 338/128, 129; 600/150

[56] References Cited

U.S. PATENT DOCUMENTS 3,818,154  6/1974  Presentey .
4,489,304  12/1984  Hayes .
5,068,499  11/1991  Kuratani .................................. 200/6 A
5,436,640  7/1995  Reeves .................................... 345/161
5,658,238  8/1997  Suzuki et al. ........................... 600/150

FOREIGN PATENT DOCUMENTS 1321440  7/1970  Italy .
Sho60-41955  12/1985  Japan .
Hei1-38673  11/1989  Japan .

*Primary Examiner*—George Manuel
*Attorney, Agent, or Firm*—Jordan and Hamburg

[57] ABSTRACT

A multidirectional switch is provided with a lever, a lever support assembly for supporting the lever in such a way that it can be slanted in directions of first and second axes intersecting each other, an automatic lever reset mechanism for causing the lever to automatically return from its slant position to neutral position, a retainer for retaining the lever in a position slanted in the second axis direction against restoration force exerted by the automatic lever reset mechanism, and a sensor of which sensing elements are arranged at positions corresponding to individual slant positions of the lever. The multidirectional switch provides different types of information depending on directions in which the lever is slanted.

20 Claims, 19 Drawing Sheets

MULTIDIRECTIONAL SWITCH AND A DRIVING GAME MACHINE USING THE SAME

BACKGROUND OF THE INVENTION

This invention relates to a multidirectional switch operational in more than one direction, such as those often used in video game machines, and to a driving game machine using such a multidirectional switch. More particularly, this invention pertains to a multidirectional switch including a lever slantable in directions of mutually intersecting first and second axes, associated with a switch sensor of which sensing elements are arranged at positions corresponding to individual slant positions of the lever, as well as to a driving game machine using the multidirectional switch.

Conventionally, multidirectional switches of this kind have chiefly been used as manipulators for controlling characters and other objects displayed on a video game monitor screen. FIG. 19 shows a general construction of a conventional multidirectional switch, which comprises a lever 151, four pins 152–155 projecting sideways from a lower portion of the lever 151 in mutually perpendicular directions, and springs 156–159 attached respectively to the outer ends of the pins 152–155 in their axial directions. The lever 151 thus constructed can be moved about a lever support to slant positions in mutually perpendicular four directions shown by arrows X1, X2, Y1 and Y2 in FIG. 19. Close to a lower part of the lever 151, there are four microswitches 160–163 individually mounted in the slanting directions of the lever 151. When the lever 151 is tipped in one direction, one of these microswitches 160–163, located in the corresponding direction, becomes ON.

With this construction, when a player of a game applies force sideways to the lever 151, it goes aslant in one direction and one of the microswitches 160–163 turns on. When the player releases the lever 151, restoration forces of the springs 156–159 cause the lever 151 to return to its upright position and the microswitches 160–163 become all OFF. The individual microswitches 160–163 turn on and off in response to the player's action on the lever 151 to sense its slanting directions, and the game goes on in accordance with information picked up by the microswitches 160–163.

A driving game machine using a multidirectional switch of the above-described conventional type has a monitor screen, and a player "drives" a simulated vehicle while watching an image displayed on the monitor screen. In playing a game such as an automobile race, the player can control the simulated vehicle in manual transmission mode, in which upshift and downshift operations are carried out by changing the lever slanting position of the multidirectional switch.

The conventional multidirectional switch provides information on different player actions as its lever 151 can be slanted in the directions of two mutually perpendicular axes. However, the lever 151 automatically returns to its upright position when released no matter in which direction it is slanted. This means that the information derived from this multidirectional switch is limited to a small number of stereotyped operations and it is impossible to obtain information on a wide variety of player actions which would be required when a game is carried out in different modes.

In the aforementioned conventional driving game machine using the conventional multidirectional switch, once the player selects manual transmission mode at the beginning of a game, there is no alternative but to drive the simulated vehicle in manual transmission mode, continually manipulating the lever of the multidirectional switch throughout the game. One problem of the conventional driving game machine is that players unskilled in manual lever operation could occasionally find it difficult to go on playing at the machine halfway during a game. Another problem of the conventional driving game machine is that, for expert players who are skilled in manual lever operation, it is not so attractively exciting to drive the vehicle by continually moving the multidirectional switch in manual transmission mode throughout the game.

SUMMARY OF THE INVENTION

It is an object of the present invention to provide a multidirectional switch and a driving game machine which have overcome the aforementioned problems of the prior art.

It is another object of the present invention to provide a multidirectional switch which gives different types of information from lever slanting operations.

It is another object of the present invention to provide a driving game machine which can offer ease of operation to players unskilled in manual operation and more excitement to skilled players.

Accordingly, the present invention is directed to a multidirectional switch comprising a lever, a lever support for supporting the lever in such a way that it can be slanted in a direction of a first axis and a direction of a second axis intersecting the first axis, an automatic lever reset mechanism for automatically returning the lever from its slant position to neutral position, a retainer for retaining the lever in a position slanted in a direction of the first or second axis against restoration force exerted by the automatic lever reset mechanism, and a sensor arranged at each of positions corresponding to individual slant positions of the lever.

Since the lever can be slanted in either of the intersecting first and second axial directions and retained in a position slanted in the first or second axial direction, it is possible to obtain different types of information depending on whether the lever is operated in the direction of the first or second axis.

The lever support may be provided with a lever holder for holding the lever, a first pair of pivot shafts projecting in opposite directions from opposite portions of the lever holder, a first shaft support for rotatably supporting the first pair of pivot shafts, a second pair of pivot shafts projecting in opposite directions from opposite portions of the first shaft support, and a second shaft support for rotatably supporting the second pair of pivot shafts.

This construction serves to ensure a smooth slanting motion of the lever when it is operated in any of its specified slanting directions.

The automatic lever reset mechanism may be provided with a first coil spring mounted around one of the first pair of pivot shafts for returning the lever holder to its neutral position when it is rotated, and a second coil spring mounted around one of the second pair of pivot shafts for returning the lever holder to its neutral position when it is rotated.

This construction ensures that the lever returns to its neutral position when an operating force applied to it is removed.

The retainer may be provided with a locking member operatively connected with the lever, the locking member including a snap-in portion and a fixing arm, and a catch including a pair of rollers which are normally pushed against each other. The locking member is secured by the catch as the snap-in portion is seized by the pair of rollers.

In this construction, when the lever is slanted in the direction where the locking member is seized by the catch, the snap-in portion pushes the rollers outward and goes into their inside space so that the lever is securely held in its slant position. When a player applies force to the lever for moving it from the slant position to the neutral position, the snap-in portion pushes the rollers outward and escapes from between them, and the automatic lever reset mechanism causes the lever to return to its neutral position.

The catch may be mounted near the lower end of the lever. The locking member may be mounted by its fixing arm to one of the second pair of pivot shafts so that the snap-in portion is located near the catch.

This construction gives a large stroke of swing motion to the snap-in portion of the locking member, ensuring positive actions of the snap-in portion when it is inserted into the inside space of the rollers and released from between them.

The lever may be made slantable in either the positive or negative direction of the first axis and in only the positive direction of the second axis.

With this arrangement, the multidirectional switch provides different types of information depending on whether the lever is operated in the positive or negative direction of the first axis, or in the positive direction of the second axis.

A driving game machine using the inventive multidirectional switch enables a player to control a simulated vehicle which is displayed on a monitor. The driving game machine may be provided with a manual transmission mode to be selected when the lever is slanted in the positive or negative direction of the first axis and an automatic transmission mode to be selected when the lever is slanted in the positive direction of the second axis.

The driving game machine thus constructed allows the player to play in manual or automatic transmission mode, whichever desired, by choosing the slanting direction of the lever of the multidirectional switch. Even when the player is not skilled in manual operation, it is possible to enjoy a driving game.

The switching may be executable between manual and automatic transmission modes by altering the slanting position of the lever even when a game is in progress.

This also allows a player unskilled in manual transmission to enjoy a driving game in desired transmission mode. A skilled player can switch between manual and automatic transmission modes during a driving game so that the game becomes more exciting and enjoyable.

The driving game machine may further provided with a timer for inhibiting alteration of the transmission gear ratio for a specified period of time after it has been once altered, the timer being set to perform a time-counting sequence only in automatic transmission mode.

This arrangement serves to ensure smooth acceleration or deceleration of the simulated vehicle in accordance with the pushed distance of an accelerator pedal for the specified period of time after the transmission gear ratio has been altered in automatic transmission mode. Since the timer is set only in automatic transmission mode, the transmission gear ratio is quickly altered in response to each lever-shifting operation in manual transmission mode and the simulated vehicle can be accelerated or decelerated at a chosen gear ratio in accordance with the pushed distance of the accelerator pedal. This arrangement also ensures quick switching between manual and automatic transmission modes even during a driving game.

The timer may be deactivated if the running speed of the simulated vehicle is equal to or less than a specified value.

With this arrangement, the transmission gear ratio is quickly altered in accordance with the pushed distance of the accelerator pedal in automatic transmission mode. This arrangement also ensures quick switching from manual to automatic transmission mode even during a driving game.

Having now summarized the invention, other objects, features and advantages thereof will become more apparent from the following detailed description and the accompanying drawings.

DETAILED DESCRIPTION OF THE PREFERRED EMBODIMENTS OF THE INVENTION

Figure 1:
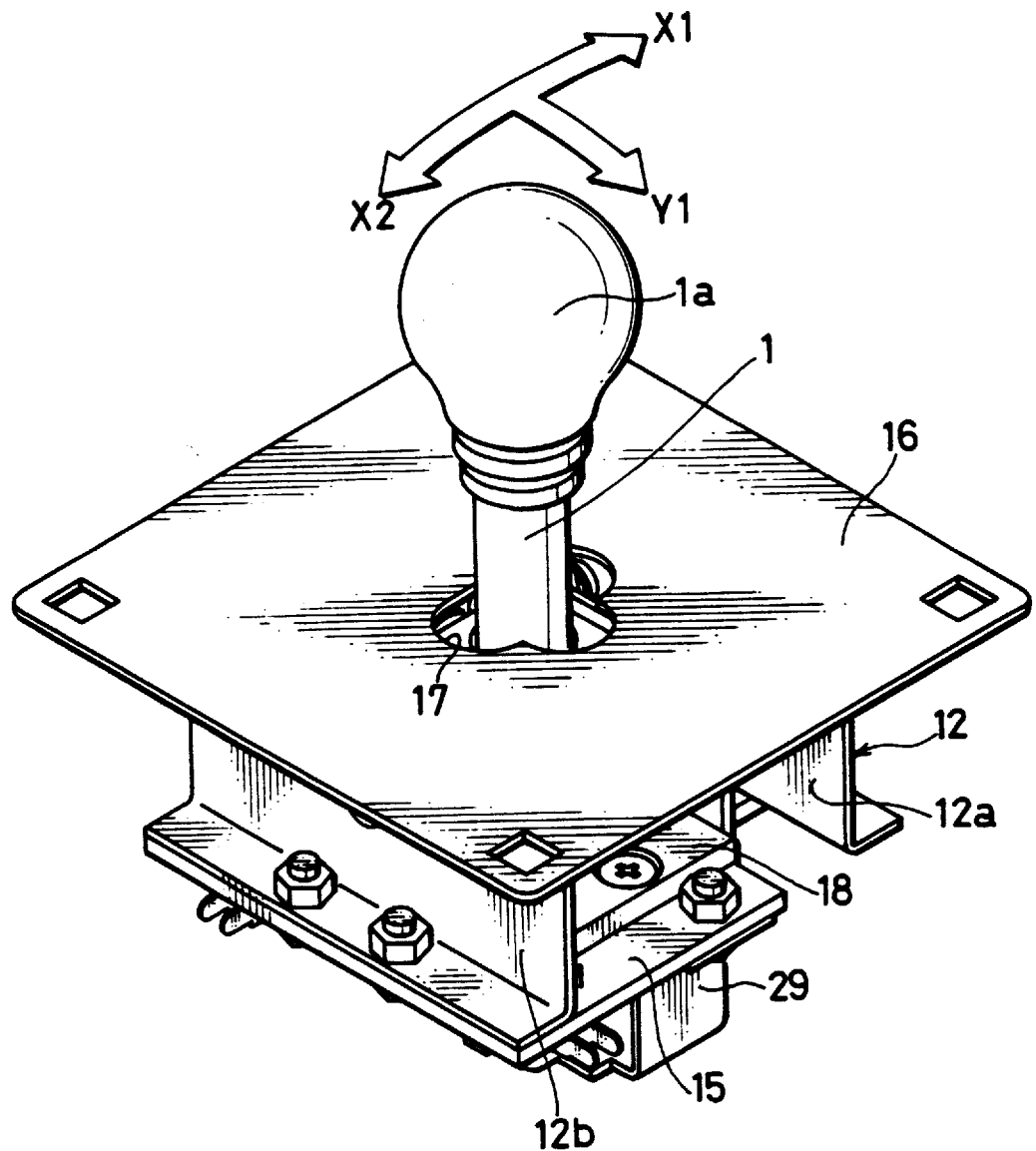
FIG. 1 is a perspective view illustrating an external appearance of a multidirectional switch according to the invention.
Figure 2:
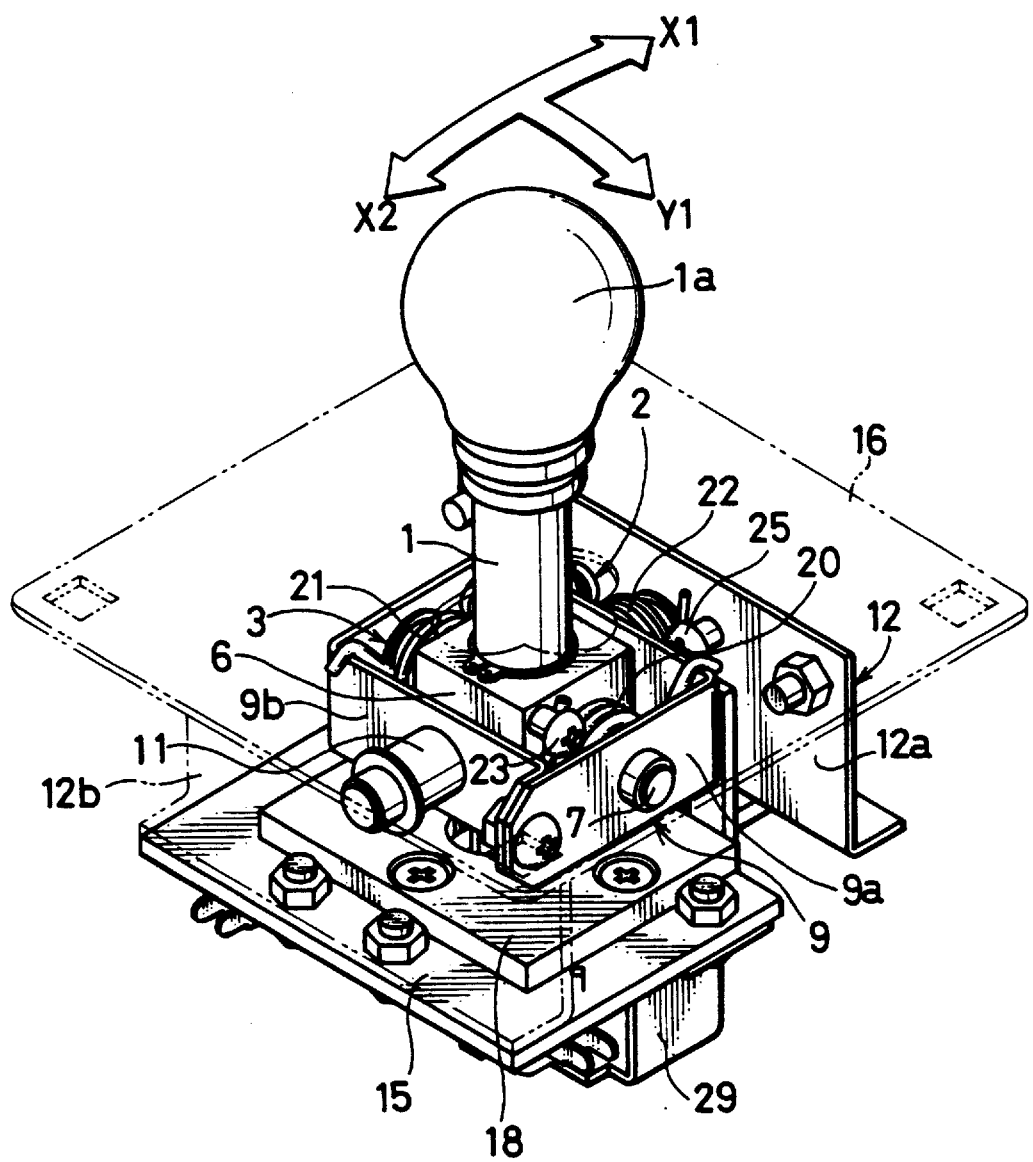
FIG. 2 is a perspective view depicting an internal construction of the multidirectional switch.
Figure 3:
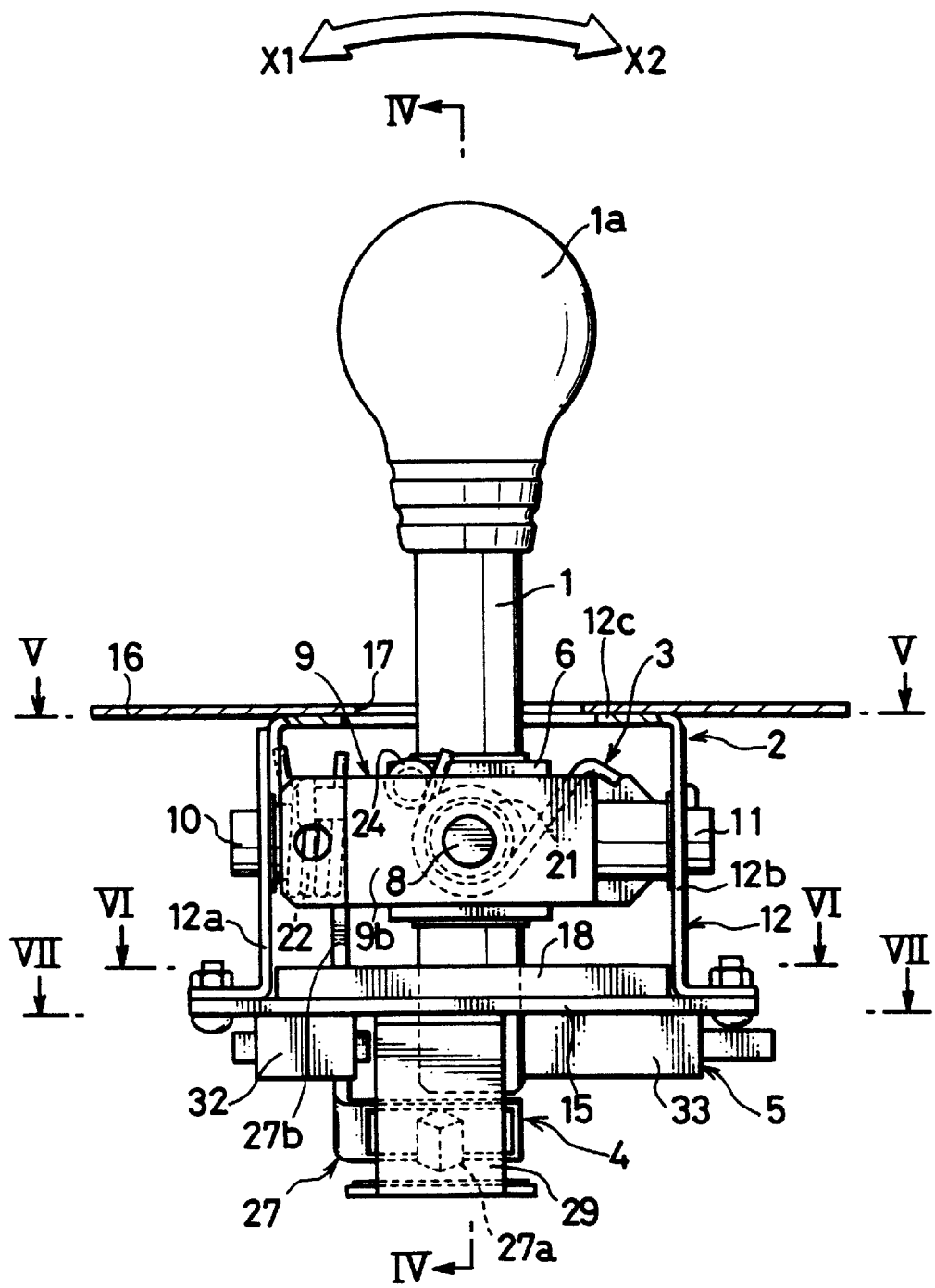
FIG. 3 is a side view of the multidirectional switch.

A multidirectional switch and a driving game machine using the multidirectional switch embodying the invention are now described with reference to the accompanying drawings.

The multidirectional switch comprises a lever 1, a lever support assembly 2 which sustains the lever 1 in such a way that it can be slanted in the directions of arrows X1 and X2 (X-axis) and in the direction of arrow Y1 (Y-axis), an automatic lever reset mechanism 3 for causing the lever 1 to automatically return from its slant position to upright position, a retainer 4 for retaining the lever 1 in a position slanted in the direction of the Y-axis against restoration force exerted by the automatic lever reset mechanism 3, and a switch sensor 5 of which sensing elements are arranged at positions corresponding to the individual slant positions of the lever 1.

Supported by the lever support assembly 2, the lever 1 has a cylindrical stick which stems out vertically in its upright position and a knob 1a screwed to the upper end of the stick.

The lever support assembly 2 includes a lever holding block 6 for holding the lever 1, a pair of pivot shafts 7, 8 projectingly attached to the lever holding block 6 in opposite directions parallel to the Y-axis, a first shaft support 9 for rotatably supporting the pair of pivot shafts 7, 8, a pair of pivot shafts 10, 11 projectingly attached to the first shaft support 9 in opposite directions parallel to the X-axis, and a second shaft support 12 for rotatably supporting the pair of pivot shafts 10, 11.

Formed in the shape of a rectangular parallelepiped, the lever holding block 6 has a vertical through hole 13 passing the middle of its top and bottom surfaces. The lever 1 supported by the lever holding block 6 as it is tightly fitted into the through hole 13. The first shaft support 9 includes a pair of L-shaped support members 9a, 9b of which corresponding ends are joined to form a rectangular frame. The pivot shaft 7 projecting from the lever holding block 6 is fitted into a hole in one straight portion of the support member 9a while the pivot shaft 8 is fitted into a hole in one straight portion of the support member 9b to rotatably support the lever holding block 6. The pivot shafts 10, 11 are securely fitted to the other straight portions of the support members 9a, 9b, respectively.

The second shaft support 12 includes a pair of upright brackets 12a, 12b mounted face to face on a base plate 15. C-shaped connecting arms 12c extending from the top of the upright bracket 12b are fixed to the upper portion of the upright bracket 12a to join them together. The pivot shaft 10 projecting from the first shaft support 9 is fitted into a hole in the upright bracket 12a of the second shaft support 12 while the pivot shaft 11 is fitted into a hole in the upright bracket 12b to rotatably support the first shaft support 9.

A top plate 16 is mounted on top of the second shaft support 12. There is formed a hole 17 in the top plate 16 for guiding the lever 1 in its slanting directions. In this embodiment, the hole 17 has a shape extending in the directions of the arrows X1 and X2 corresponding to the positive and negative sides of the X-axis and in the direction of the arrow Y1 corresponding to the positive side of the Y-axis, allowing the lever 1 to be moved in the respective directions. There is mounted a guide plate 18 on top of the base plate 15 for limiting slanting directions and angles of the lever 1. Specifically, the guide plate 18 has a through hole 19 through which the lever 1 is passed. The through hole 19 is shaped so that the lever 1 can only be slanted in the directions of the arrows X1, X2 and Y1 at specified tilt angles. When a player moves the lever 1 in the X1 or X2 direction, the pivot shafts 7, 8 are caused to rotate. When the player moves the lever 1 in the Y1 direction, the pivot shafts 10, 11 are caused to rotate.

The automatic lever reset mechanism 3 includes a pair of coil springs 20, 21 respectively mounted around the pivot shafts 7, 8 in order to exert force for causing the lever holding block 6 to revert to its upright position when it is rotated in the X1 or X2 direction, and another coil spring 22 mounted around the pivot shaft 10 in order to exert force for causing the lever holding block 6 to revert to its upright position when it is rotated in the Y1 direction.

One end of the coil spring 20 is hooked to the upper edge of the support member 9a of the first shaft support 9 while the other end is hooked to a projection 23 provided by a screw fixed to the lever holding block 6. When the lever 1 is slanted in the X1 direction, the coil spring 20 is forced to tighten, and when the lever 1 is released, restoration force of the coil spring 20 causes the lever 1 to return to its upright position automatically.

Similarly, one end of the coil spring 21 is hooked to the upper edge of the support member 9b of the first shaft support 9 while the other end is hooked to a projection 24 provided by a screw fixed to the lever holding block 6. When the lever 1 is slanted in the X2 direction, the coil spring 21 is forced to tighten, and when the lever 1 is released, restoration force of the coil spring 21 causes the lever 1 to return to its upright position automatically.

Also, one end of the coil spring 22 is hooked to a projection 25 provided by a screw fixed to the upright bracket 12a of the second shaft support 12 while the other end is hooked to a projection 26 provided by a screw fixed to the support member 9a of the first shaft support 9. When the lever 1 is slanted in the Y1 direction, the coil spring 22 is forced to tighten, and when the lever 1 is released, restoration force of the coil spring 22 causes the lever 1 to return to its upright position automatically.

Figure 4:
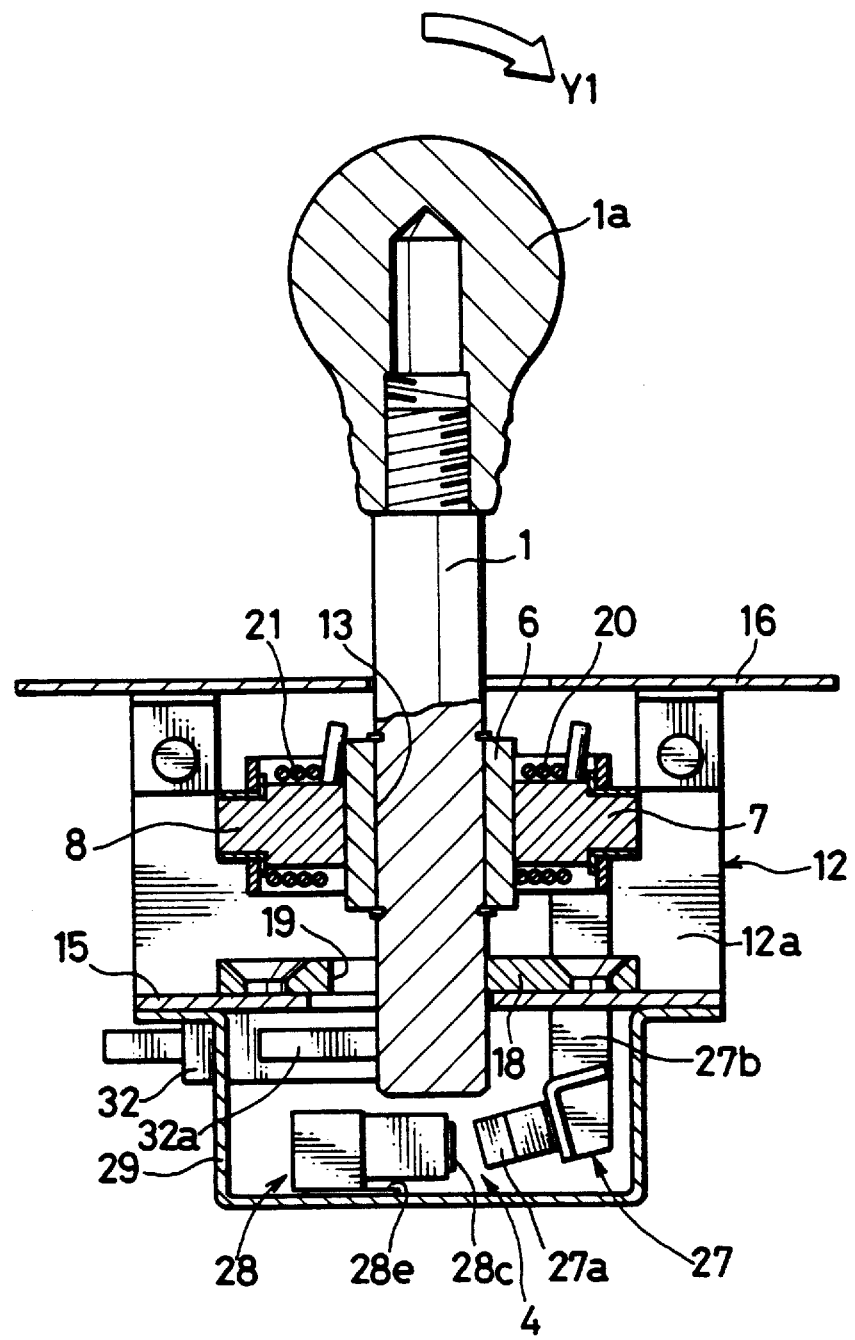
FIG. 4 is a cross-sectional view of the multidirectional switch taken in the direction of arrows along lines IV—IV of FIG. 3.
Figure 5:
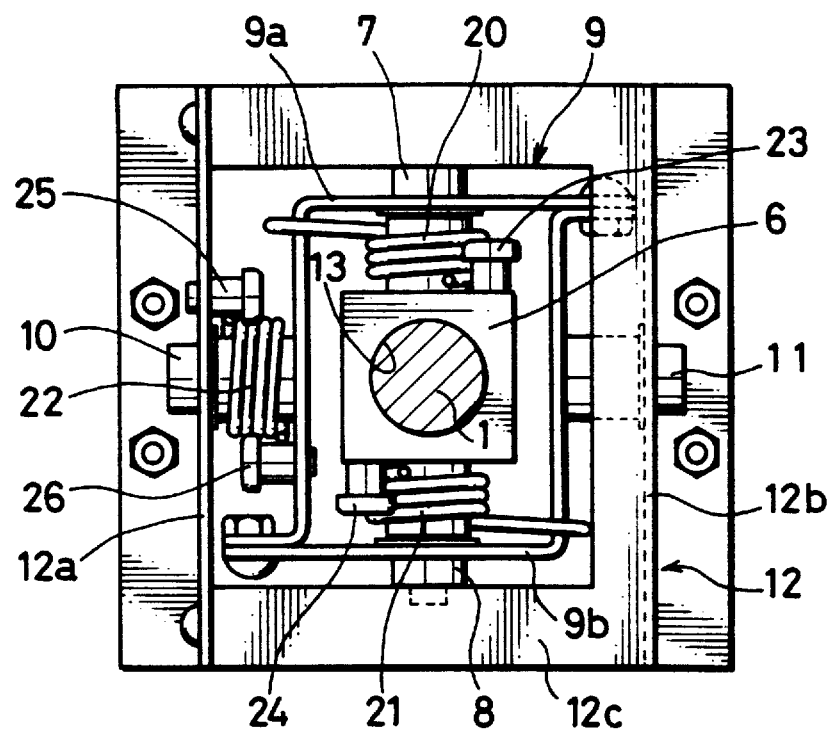
FIG. 5 is a plan view of the multidirectional switch taken in the direction of arrows along lines V—V of FIG. 3.

The retainer 4 comprises a locking member 27 interlocked with the lever 1 for coordinated movements and a double-roller spring-action catch 28. The locking member 27 includes a tubular box-shaped snap-in projection 27a and an elongate fixing arm 27b, which is mounted to the pivot shaft 10 in such a way that the snap-in projection 27a is located near the lower end of the lever 1. More specifically, when the lever 1 is in its upright position, the box-shaped snap-in projection 27a is obliquely tipped down with its one edge directed to the catch 28, as shown in FIG. 4. The catch 28 includes a pair of rollers 28c, 28d rotatably mounted to respective brackets 28a, 28b. The brackets 28a, 28b are tensioned inward by a built-in spring to provide a snapping force. The catch 28 is fixed below the lower end of the lever 1 by its mounting plate 28e to a bottom portion of a frame 29, which is attached to the underside of the base plate 15.

When the lever 1 is slanted in the Y1 direction, the snap-in projection 27a of the locking member 27 moves toward the catch 28 and goes into contact with the rollers 28c, 28d. When forced further against the rollers 28c, 28d, the snap-in projection 27a pushes them outward and goes into a space between the two brackets 28a, 28b. When the snap-in projection 27a is fully inserted into the space between the two brackets 28a, 28b, the rollers 28c, 28d return to their original inward positions, where they come into contact with each other, with the aid of the built-in spring. As the snap-in projection 27a is snapped by the rollers 28c, 28d in this manner, the lever 1 is held in a slant position in the Y1 direction despite the restoration force exerted by the coil spring 22. Although the snap-in projection 27a is directed obliquely downward lever 1 when the lever 1 is upright, the snap-in projection 27a is set to its upright position when it is pushed into the space in between the two brackets 28a, 28b and secured by the rollers 28c, 28d. If the player applies force to the lever 1 for moving it from the slant position to upright position, the snap-in projection 27a pushes the rollers 28c, 28d outward and escapes from between them. The lever 1 then reverts to its upright position, driven by the restoration force of the coil spring 22. Since the snap-in projection 27a of the locking member 27 mounted to the pivot shaft 10 is located near the lower end of the lever 1 as described above, the fixing arm 27b of the locking member 27 has a large length. This means that the snap-in projection 27a has a large stroke of swing motion. This would help ensure positive actions of the snap-in projection 27a when it is inserted into the inside space of the rollers 28c, 28d and released from between them.

The switch sensor 5 includes first to third microswitches 31–33 mounted to the underside of the base plate 15. The first microswitch 31 is mounted at a position where it becomes ON or OFF when the lever 1 is slanted in the X1 direction and its lower portion is pressed against a moveable contact 31a of the first microswitch 31. The second microswitch 32 is mounted at a position where it becomes ON or OFF when the lever 1 is slanted in the X2 direction and its lower portion is pressed against a moveable contact 32a of the second microswitch 32. The third microswitch 33 is mounted at a position where it becomes ON or OFF when the lever 1 is slanted in the Y1 direction and its lower portion is pressed against a moveable contact 33a of the third microswitch 33. Located at these positions, the first to third microswitches 31–33 constituting the switch sensor 5 sense the individual slanting directions of the lever 1.

According to the above-described construction of the multidirectional switch of the invention, the lever 1 slanted in the X1 or X2 direction automatically returns to its upright position when the player releases the lever 1. However, the lever 1 slanted in the Y1 direction does not return automatically to its upright position even when the player releases the lever 1. This means that the multidirectional switch of the invention provides different types of information depending on whether the lever 1 is operated in the directions of the X- or Y-axis. More particularly, when the lever 1 is moved along the X-axis, the first or second microswitch 31, 32 senses the slanting direction of the lever 1, providing information on instantaneous player actions only. When the lever 1 is moved along the Y-axis, the third microswitch 33 continues to sense the slanting direction of the lever 1 even after the player releases the lever 1, continuously providing information on the result of a player action.

Although the lever 1 can be slanted in the X1 and X2 directions corresponding to the positive and negative sides of the X-axis and in the Y1 direction corresponding to the positive side of the Y-axis in this embodiment, it may be made moveable in the negative direction of the Y-axis as well. In this case, the through hole 19 in the guide plate 18 should be reshaped to allow such movements of the lever 1, and the automatic lever reset mechanism 3 and switch sensor 5 should be provided with an additional coil spring and microswitch as appropriate. Furthermore, the X- and Y-axes along which the lever 1 is moved need not be arranged at right angles as long as they intersect each other.

Although the lever 1 is pivotable in the X-axis directions about the pivot shafts 7, 8 attached to the first shaft support 9 and in the Y-axis directions about the pivot shafts 10, 11 attached to the second shaft support 12 in the above embodiment, the lever 1 may be made pivotable in the X-axis directions about the pivot shafts 10, 11 and in the Y-axis directions about the pivot shafts 7, 8.

In this embodiment, the retainer 4 is constructed such that the locking member 27 is interlocked with the lever 1 and the catch 28 is fixed to the frame 29. In an alternative construction, the locking member 27 may be fixed to the frame 29 and the catch 28 interlocked with the lever 1. It would also be apparent to those skilled in the art that the locking member 27 and catch 28 may be constructed differently from the aforementioned shapes and mechanism of the preferred embodiment. As an example, the locking member 27 may be seized by the catch 28 by magnetic attraction. Although the locking member 27 is supported with its fixing arm 27b attached to the pivot shaft 10 in the above embodiment, the locking member 27 may be fixed to another appropriate position as long as it is interlocked with the lever 1. Specifically, it may be mounted to the pivot shaft 7, pivot shaft 8, pivot shaft 11, lever holding block 6 or first shaft support 9, for instance.

The retainer 4 holds the lever 1 at its slant position in the positive direction of the Y-axis. Alternatively, the retainer 4 may be constructed to maintain the lever 1 at one slant position in the positive or negative direction of the X-axis, or at two slant positions in both directions.

The first to third microswitches 31–33 for sensing slanting directions of the lever 1 are used. However, it is possible to substitute other types of switches such as magnetic switches or photoelectric switches for the first to third microswitches 31–33. Magnet pieces will be attached to a lower portion of the lever 1 if magnetic switches are used while light path interrupting plates will be attached to a lower portion of the lever 1 if photoelectric switches are used.

Figure 8:
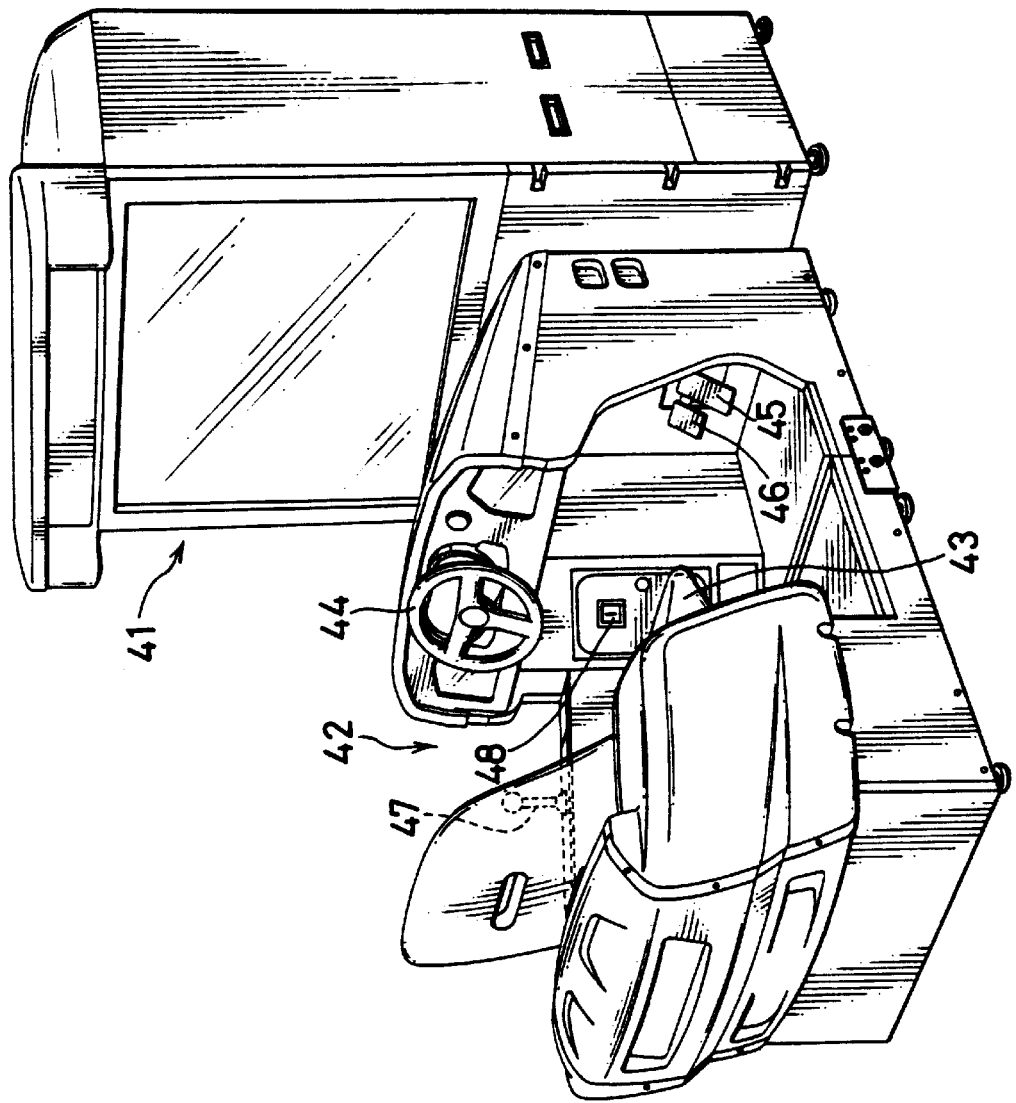
FIG. 8 is a perspective view illustrating an external appearance of a driving game machine using the multidirectional switch of the invention.

FIG. 8 is a perspective view illustrating an external appearance of a driving game machine using the aforementioned multidirectional switch.

The driving game machine generally comprises a monitor 41 and a cockpit 42. The monitor 41 includes a cathode ray tube (hereinafter referred to as the CRT) for displaying images of vehicles and a road, for instance. The cockpit 42 has a shape resembling a driver's seat of a motor vehicle, including a seat 43, a steering wheel 44, an accelerator pedal 45, a brake pedal 46, a gearshift lever 47. The cockpit 42 is also provided with a token slot 48 for inserting tokens. Controls such as the steering wheel 44, accelerator pedal 45, brake pedal 46 and gearshift lever 47 are individually provided with sensors for sensing their positions. A came goes on as a player sitting on the seat 43 manipulates the steering wheel 44, accelerator pedal 45, brake pedal 46, gearshift lever 47 and other controls, if provided, while watching a simulated scene including vehicles displayed on the monitor 41.

The earlier-described multidirectional switch is used to constitute the gearshift lever 47. Specifically, the multidirectional switch is mounted in such a way that the X1 and X2 directions of the lever 1 coincide with the frontward and rearward directions of the cockpit 42, respectively. If the lever 1 is slanted in the forward (X1) direction several times, for instance, a transmission gear position displayed on the monitor 41 is upshifted in accordance with the number of upshift actions. Similarly, if the lever 1 is slanted in the rearward (X2) direction, the transmission gear position is downshifted in accordance with the number of downshift actions.

Individual upshift or downshift actions are sensed by the microswitches 31, 32 corresponding to the respective slanting directions of the lever 1. Output signals of the microswitches 31, 32 are delivered to an up/down counter, which increments or decrements its count with each input pulse. A resultant position of the gearshift lever 47 is determined by a predefined data processing operation. A coefficient corresponding to the current gearshift lever position is read from a coefficient table, in which a plurality of coefficients corresponding to individual shift positions are stored. Vehicle speed in manual transmission mode is determined by multiplying the pushed distance of the accelerator pedal 45 by the coefficient. The player feels as if he, or she, is actually "driving" a manual transmission automobile when playing a game.

If the lever 1 is slanted sideways in the Y1 direction, the lever 1 is locked in that position. In a preferred embodiment, a simulated vehicle is set to automatic transmission mode in this case, where the transmission is automatically shifted to appropriate gear ratios. When the lever 1 is slanted in the Y1 direction, the second microswitch 32 corresponding to that slant position senses that the player has selected automatic transmission mode and transmits an output signal. Then, a predefined data processing operation is carried out to determine a gearshift lever position in accordance with the pushed distance of the accelerator pedal 45. A coefficient corresponding to the gearshift lever position thus determined is read from the coefficient table, and vehicle speed in automatic transmission mode is determined by multiplying the pushed distance of the accelerator pedal 45 by the coefficient. The player can enjoy a game even if he, or she, is not skilled in manual shifting of the transmission.

The player can select whether to play in manual or automatic transmission mode by locking the lever 1 aslant in the Y1 direction or releasing it therefrom at the beginning of a game. It is also possible to switch between the two modes while the game is in progress. In a case where a player unskilled in manual transmission finds it difficult to continue playing in manual transmission mode in the course of a game, the player can switch to automatic transmission mode at that point and enjoy the remaining part of the game. A skilled player can switch between manual and automatic transmission modes in accordance with road conditions (e.g., uphill or flat) during a game so that the game becomes more exciting and enjoyable.

The driving game machine of the preferred embodiment using the multidirectional switch of the invention is now described in greater detail.

Figure 9:
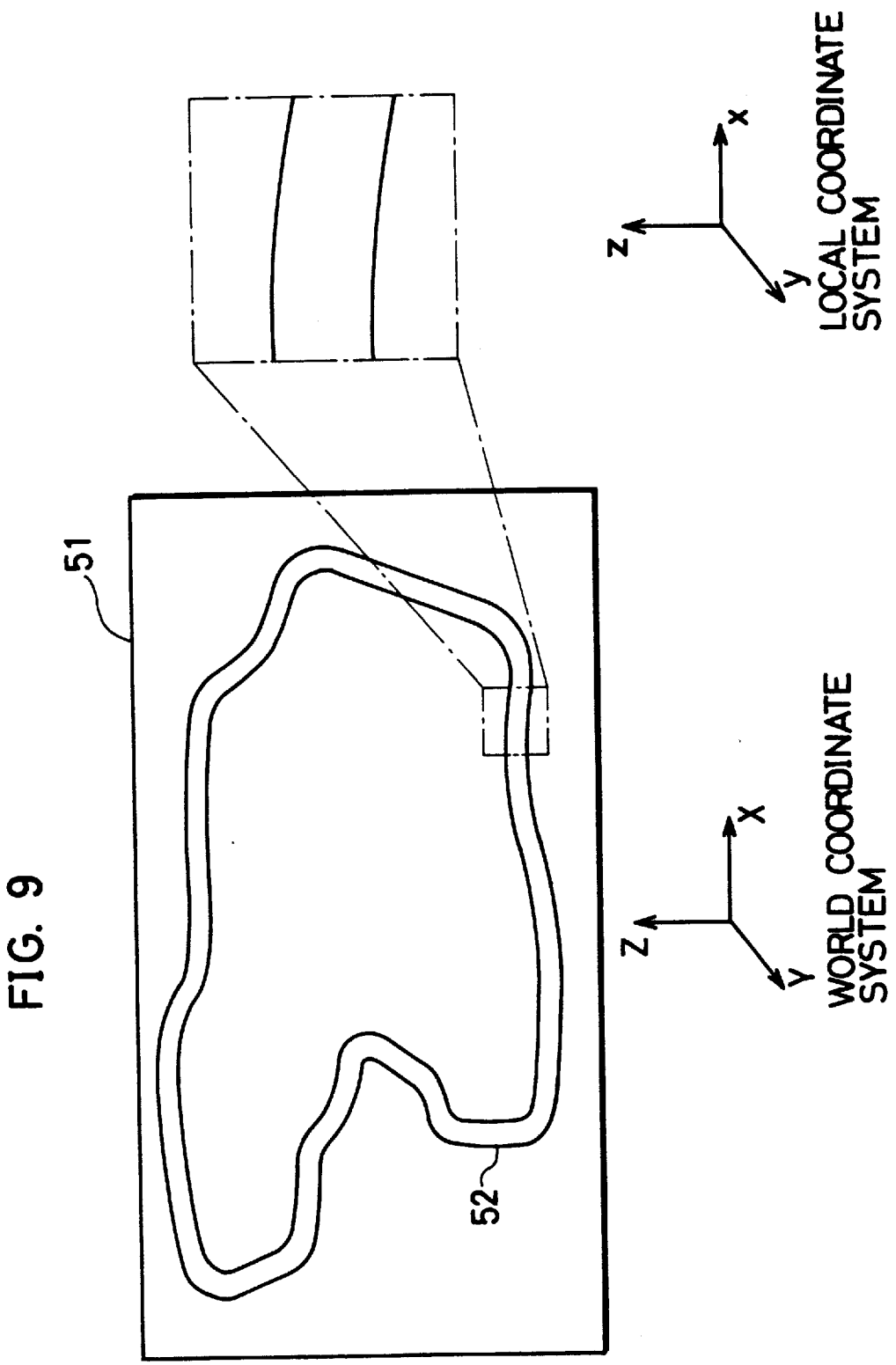
FIG. 9 is a schematic diagram illustrating a simulated field in which a player plays a driving game in the driving game machine of FIG. 8.
Figure 10:
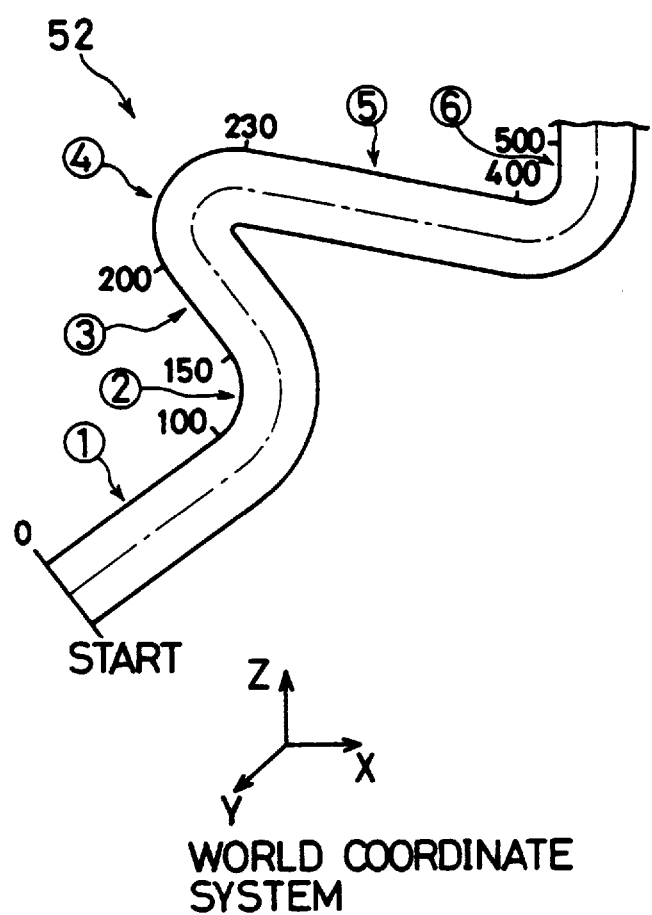
FIG. 10 is a schematic diagram illustrating a part of a simulated closed track.

FIG. 9 is a schematic diagram illustrating a driving game field 51 simulated by the driving game machine of the embodiment; FIG. 10 is a schematic diagram illustrating part of a simulated closed track 52; and FIG. 11 is a diagram showing part of the closed track 52 as FIG. 10 as a straight roadway 520 using imaginary Cartesian coordinates.

The field 51 shown in FIG. 9 represents an entire space simulated in the driving game machine by way of computer graphics imagery. The field 51 includes the simulated closed track 52 running close to the periphery of the field 51 as well as buildings and other models (not shown). The closed track 52 is divided into segmental road models ①, ②, ③, ④, ⑤, ⑥ and so forth at specified distances from a starting point as shown in FIG. 10. The word "model" used in this Specification refers to each individual on-screen object simulated by using computer graphics technology.

A three-dimensional world coordinate system (X, Y, Z) as shown in FIG. 9 is established for the field 51. A local coordinate system (x, y, z) is established for each subspace for defining the shape of each model such as a road model, a building model, or any other type of object.

Figure 11:
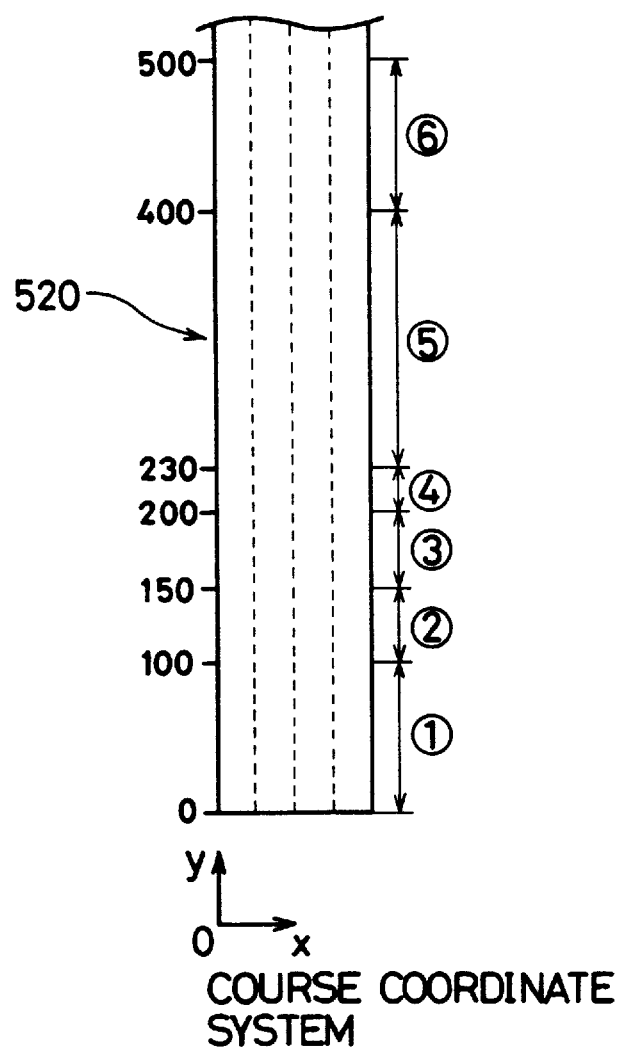
FIG. 11 is a diagram showing a part of the closed track as FIG. 10 as a straight roadway using imaginary Cartesian coordinates.

The straight roadway 520 shown in FIG. 11 is obtained by converting the curved closed track 52 into Cartesian coordinates so that the centerline of the closed track 52 becomes straight and parallel with one axis of the Cartesian coordinates. A two-dimensional course coordinate system (x, y) depicted in FIG. 11 is a coordinate system established for the straight roadway 520, in which a y-coordinate expresses a distance from the starting point while an x-coordinate gives a lateral position across the straight roadway 520. There are provided four lanes on the straight roadway 520, and therefore on the closed track 52, in this embodiment as shown in FIG. 11.

In a driving game played in the driving game machine, a player drives his, or her, own vehicle (hereinafter referred to as the prime vehicle) on the closed track 52. The player can take over other vehicles running on the closed track 52. In this embodiment, some tens of other vehicles which are controlled by the driving game machine are simulated. The monitor 41 displays an image of surrounding building models and other vehicles on the closed track 52 situated within the player's field of vision in accordance with the current position and orientation of the prime vehicle.

Figure 12:
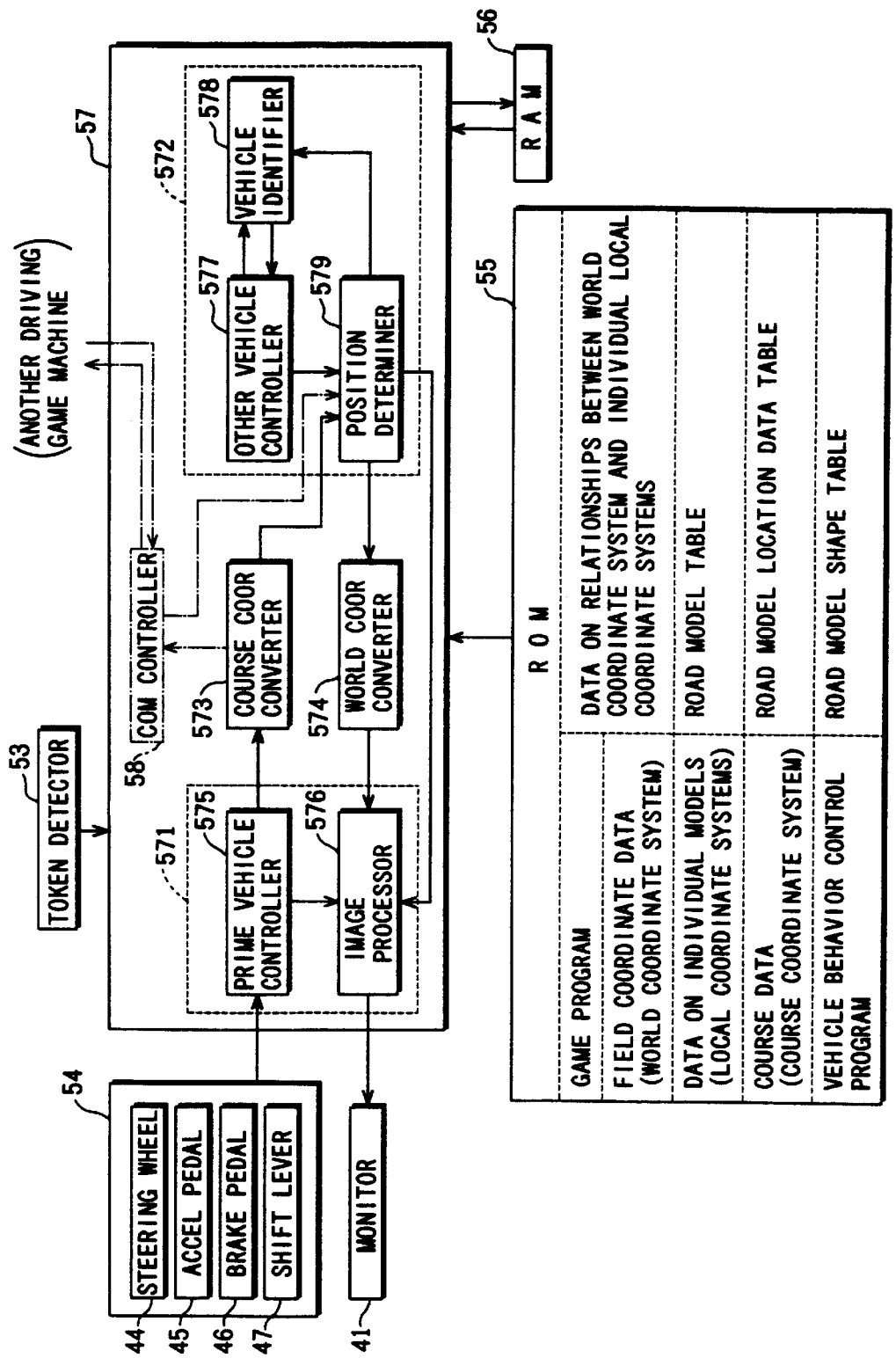
FIG. 12 is a block diagram of a control system of the driving game machine.

FIG. 12 is a block diagram of a control system of the driving game machine of the preferred embodiment.

The control system comprises the monitor 41, a token detector 53, a player input block 54, a read-only-memory (hereinafter referred to as the ROM) 55, a random-access-memory (hereinafter referred to as the RAM) 56 and a control block 57.

The token detector 53 detects tokens inserted through the token slot 48 shown in FIG. 8 and outputs a detection signal to the control block 57.

Comprising the steering wheel 44, accelerator pedal 45, brake pedal 46 and gearshift lever 47, the player input block 54 senses various player actions including the angle of rotation of the steering wheel 44, the pushed distance and pushing speed of the accelerator pedal 45, the pushed distance of the brake pedal 46, and position of the gearshift lever 47. Data on such player actions are transmitted to a prime vehicle controller 575 which will be described later in this Specification.

The ROM 55 stores a game program for running the driving game machine, field coordinate data based on the aforementioned world coordinate system, coordinate data for simulated models based on individual local coordinate systems, course data based on the aforementioned course coordinate system, a program for controlling behaviors of simulated vehicles in accordance with automotive engineering theories, data for defining relationships between the world coordinate system and the individual local coordinate systems, and data for tables 1 to 3 which will be described later. The RAM 56 serves as a temporary storage for various kinds of data.

Comprising a central processing unit (hereinafter referred to as the CPU) and logic circuitry, the control block 57 controls operation of the driving game machine and checks whether the player has inserted a token into the token slot 48 based on the state of the detection signal delivered from the token detector 53.

Referring to FIG. 12, the control block 57 includes a world coordinate system processor 571, a course coordinate system processor 572, a course coordinate system converter 573 and a world coordinate system processor 574.

The world coordinate system processor 571 includes the aforementioned prime vehicle controller 575 and an image generation processor 576 to perform control operation in the world coordinate system. The course coordinate system processor 572 includes an other vehicle controller 577, an interfering vehicle identifier 578 and a position determiner 579 to perform control operation in the course coordinate system.

The prime vehicle controller 575 of the world coordinate system processor 571 controls behaviors of the prime vehicle in accordance with the automotive engineering based program stored in the ROM 55 and the data on player actions entered from the player input block 54. The course coordinate system converter 573 converts the prime vehicle's coordinate data from the world coordinate system to the course coordinate system.

The other vehicle controller 577 of the course coordinate system processor 572 controls movements of a plurality of other vehicles on the imaginary straight roadway 520 (FIG. 11) using the course coordinate system in such a way that individual vehicles other than the prime vehicle can alter their running speeds or move from one lane to another, for instance, in predefined conditions. Since a y-coordinate in the course coordinate system used in the other vehicle controller 577 corresponds to a particular distance traveled by the prime vehicle from the starting point, a current position of each vehicle can be easily obtained by just adding (sampling time interval)×(vehicle speed) to the current y-coordinate. Also, an x-coordinate corresponds to a particular lateral position across the straight roadway 520. Lateral movements, such as a lane alteration, can therefore be easily controlled by just adding or subtracting (sampling time interval)×(lateral moving speed) to or from the current x-coordinate.

The position determiner 579 determines positional relationships including minor and major collisions between the prime vehicle and other vehicles and between vehicles other than the prime vehicle. It also determines which of the other vehicles come into the field of vision as viewed from the prime vehicle. The position determiner 579 uses the coordinate data received from the course coordinate system converter 573 for expressing the prime vehicle's current position. The prime vehicle's visual field is predefined in terms of clockwise and counterclockwise angles as measured from the direction of travel and a frontward distance from the prime vehicle. When the position determiner 579 judges that a collision has occurred between the prime vehicle and another vehicle, it transmits a collision signal to the image generation processor 576.

The interfering vehicle identifier 578 examines in accordance with a later-described routine shown in FIG. 13 if the prime vehicle or any other vehicle is traveling in the same lane with and in front of a particular vehicle chosen from all the vehicles other than the prime vehicle based on the positional relationships between the prime vehicle and other vehicles and between vehicles other than the prime vehicle determined by the position determiner 579. The judgment result of the interfering vehicle identifier 578 is used by the other vehicle controller 577 for controlling movements of the individual vehicles. The interfering vehicle identifier 578 may additionally examine whether there is any nearby vehicle traveling in an adjacent lane so that it becomes possible to determine whether a particular vehicle can alter lanes.

The world coordinate system processor 574 converts position coordinates of the other vehicles which have been judged by the position determiner 579 to be falling within the prime vehicle's visual field from the course coordinate system to the world coordinate system in accordance with a later-described routine shown in FIG. 18.

The image generation processor 576 of the world coordinate system processor 571 produces a combined image of segmental road models, building models situated along the closed track 52 (FIG. 9) and other models falling within the prime vehicle's visual field as well as the other vehicles whose position coordinates have been converted to the world coordinate system in accordance with the prime vehicle's position and orientation determined by the prime vehicle controller 575, by using three-dimensional image processing techniques of the prior art such as geometric modeling and rendering. The image thus produced is displayed on the CRT screen of the monitor 41. The image generation processor 576 causes the image shown on the monitor 41 to vibrate or turn around, as would be seen when the prime vehicle spins, when a collision signal is received from the position determiner 579.

The position determiner 579 can easily and quickly determine positional relationships between the prime vehicle and other vehicles and between vehicles other than the prime vehicle and identify vehicles falling within the prime vehicle's visual field. This is because the position determiner 579 uses the two-dimensional course coordinate system in making such decisions as described above.

The course coordinate system processor 572 handles two-dimensional position coordinates of the individual other vehicles, and position coordinates of only those vehicles which are displayed on the monitor 41 are converted into coordinates expressed by the three-dimensional world coordinate system. This approach serves to prevent overloading of the CPU and increase the number of other vehicles that can be controlled simultaneously. It is therefore possible to present a three-dimensional image providing realistic sensations and more fun in playing a driving game.

Operation of the interfering vehicle identifier 578 is now described with reference to the flowchart of FIG. 13, which shows an operational sequence used for identification of interfering vehicles.

Coordinates of a chosen vehicle are expressed by $(x_0, y_0)$ and coordinates of a vehicle k other than the chosen vehicle are expressed by $(x_k, y_k)$ using the course coordinate system, where k is an integer taken from 1 to n. ("n" is the number of simulated vehicles including prime vehicle, but excluding the chosen vehicle.) The width of each lane of the straight roadway 520 is expressed by D.

Figure 13:
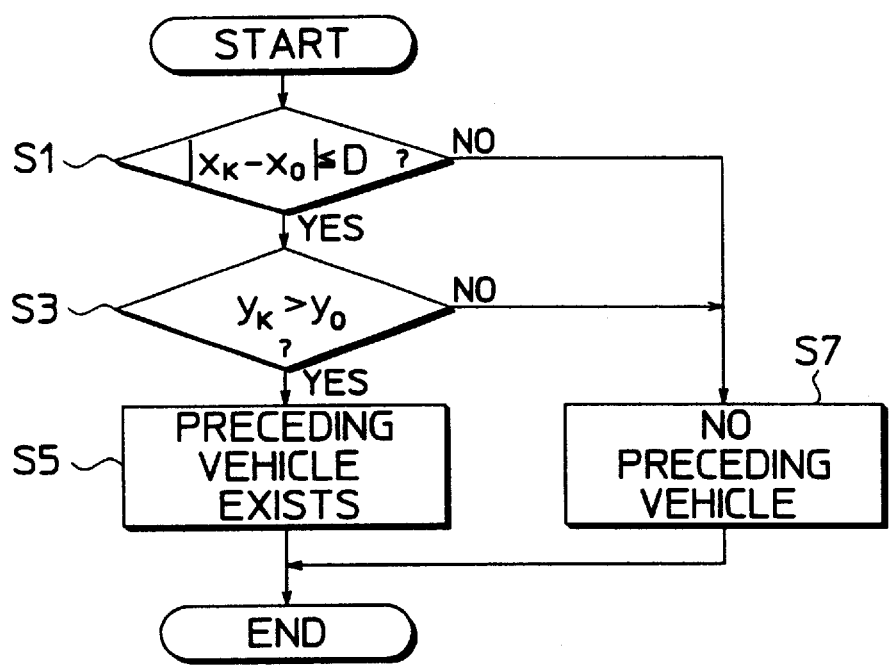
FIG. 13 is a flowchart showing an operational sequence used for identification of interfering vehicles.

Referring to FIG. 13, it is first judged whether $|x_k-x_0|$ is equal to or smaller than D (Step S1). If $|x_k-x_0| \leq D$ (Yes in Step S1), a further judgment is made as to whether $y_k$ is greater than $y_0$ (Step S3). If $y_k > y_0$ (Yes in Step S3), it is judged that the vehicle k is situated in front of the chosen vehicle (Step S5).

If $|x_k-x_0| > D$ (No in Step S1), it is judged that the vehicle k is not situated in front of the chosen vehicle (Step S7). Also, if $y_k \leq y_0$ (No in Step S3), it is judged that the vehicle k is not situated in front of the chosen vehicle (Step S7).

The above sequence is repeatedly executed for all vehicles (1 to n) other than the chosen vehicle so that every vehicle situated in the same lane with and in front of the chosen vehicle are identified.

In computer-aided control of a driving game machine, identification of interfering vehicles generally requires the most complicated data processing and the largest number of operating steps. It is however essential to check whether there is any vehicle traveling in the course line ahead of a particular vehicle by using the aforementioned interfering vehicle identification sequence or else. If three-dimensional coordinates are used for calculating positions of all simulated vehicles and for displaying a three-dimensional image through judgment of positional relationships between individual vehicles and identification of interfering vehicles as described above, a resultant game program would have much complexity involving a long sequence of operating steps. In this embodiment, the interfering vehicle identification sequence is made considerably simple as shown in FIG. 13 by the use of the two-dimensional course coordinate system. This makes it possible to simulate dozens of other vehicles simultaneously and provide enhanced excitement in a driving game.

Figure 14:
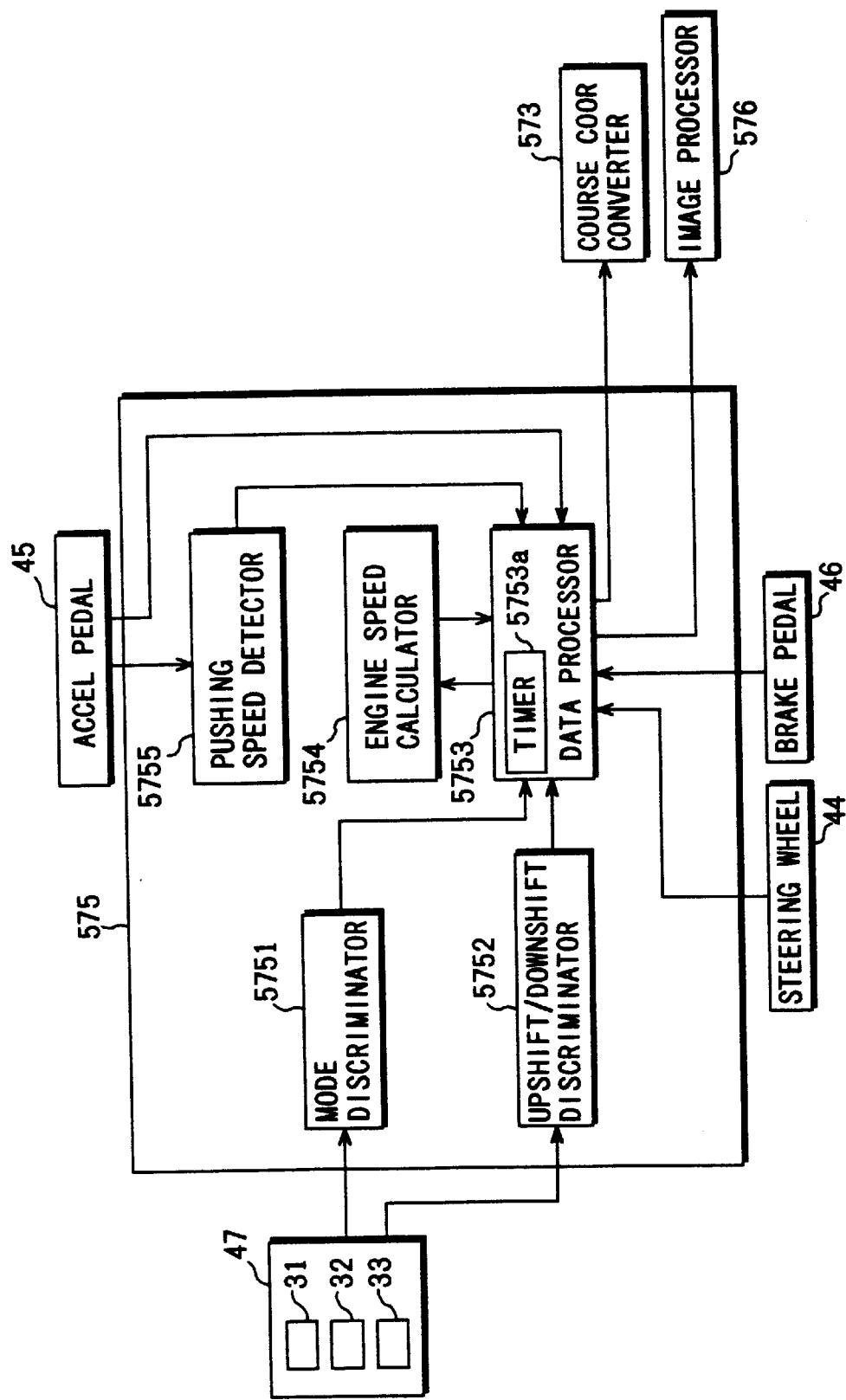
FIG. 14 is a block diagram of a prime vehicle controller of the control system.

As already stated, the prime vehicle controller 575 of the world coordinate system processor 571 controls behaviors of the prime vehicle in accordance with the automotive engineering based program stored in the ROM 55 and the data on player actions entered from the player input block 54. The gearshift lever 47 of the driving game machine of this embodiment uses the multidirectional switch of the invention. The prime vehicle controller 575 has a configuration as shown in FIG. 14 for carrying out different forms of data processing in manual and automatic transmission modes by using data on player actions.

Specifically, the prime vehicle controller 575 includes a mode discriminator 5751 for judging whether the gearshift lever 47 is set in manual or automatic transmission mode, an upshift/downshift discriminator 5752 for judging whether the player has upshifted or downshifted the transmission in manual transmission mode and determining the current gearshift lever position of the primary vehicle, a player action data processor 5753 for carrying out a predefined data processing operation using data fed from the mode discriminator 5751 and upshift/downshift discriminator 5752, an engine speed calculator 5754 for determining the revolving speed of the primary vehicle's simulated engine using data fed from the player action data processor 5753, and an accelerator pedal pushing speed detector 5755 for determining the accelerator pedal pushing speed from player action data fed from the accelerator pedal 45. Upon receiving data concerning player actions on the steering wheel 44, accelerator pedal 45 and brake pedal 46, the player action data processor 5753 performs a predefined data processing operation and outputs resultant data to course coordinate system converter 573 and image generation processor 576.

Figure 6:
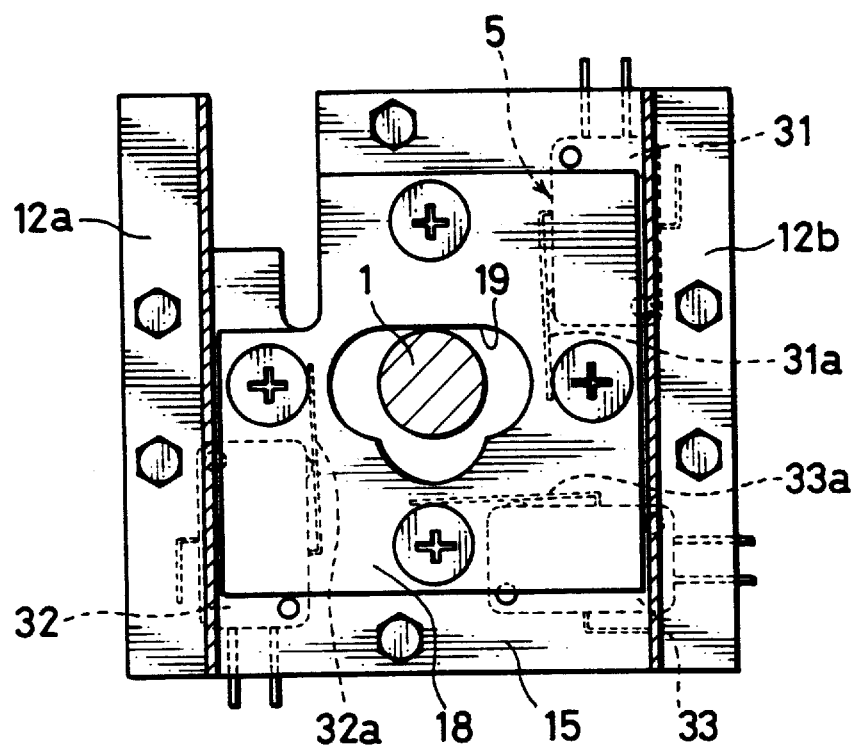
FIG. 6 is a plan view of the multidirectional switch taken in the direction of arrows along lines VI—VI of FIG. 3.
Figure 7:
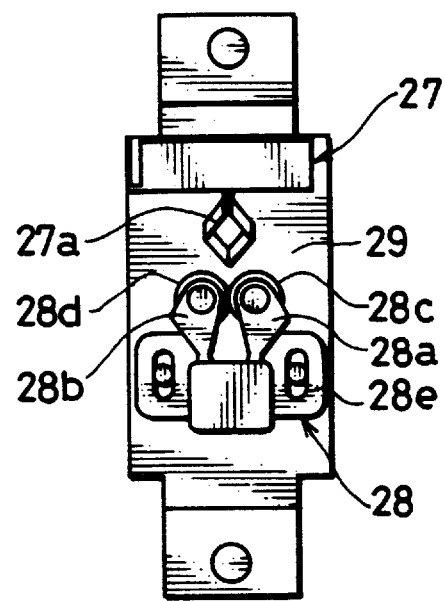
FIG. 7 is a plan view of the multidirectional switch, excluding microswitches, taken in the direction of arrows along lines VII—VII of FIG. 3.

The mode discriminator 5751 judges that manual transmission mode is currently selected when the gearshift lever 47 is not slanted in the Y1 direction, that is, the moveable contact 31a of the third microswitch 33 of the multidirectional switch shown in FIG. 6 is not depressed. When the moveable contact 31a is depressed, the mode discriminator 5751 judges that automatic transmission mode is currently selected.

The upshift/downshift discriminator 5752 judges that the player has upshifted the transmission when the moveable contact 31a of the first microswitch 31 of the multidirectional switch shown in FIG. 6 is pressed, and transmits data corresponding to the number of times the moveable contact 31a has been pressed in succession to the player action data processor 5753. The upshift/downshift discriminator 5752 also judges that the player has downshifted the transmission when the moveable contact 32a of the second microswitch 32 is pressed, and transmits data corresponding to the number of times the moveable contact 32a has been pressed in succession to the player action data processor 5753.

The player action data processor 5753 generates gear status information based on upshift action data received from the upshift/downshift discriminator 5752 and upshifts the transmission up to a fifth gear position based on other operation data in manual transmission mode. Also in manual transmission mode, the player action data processor 5753 generates gear status information based on downshift action data received from the upshift/downshift discriminator 5752 and downshifts the transmission based on other operation data. In automatic transmission mode, the player action data processor 5753 determines a gearshift lever position in accordance with the pushed distance of the accelerator pedal 45 and upshifts the transmission up to the fifth gear position. More particularly, the player action data processor 5753 generates gear status information based on data received from the engine speed calculator 5754, accelerator pedal pushing speed detector 5755, etc. and upshifts or downshifts the transmission in automatic transmission mode. The player action data processor 5753 also determines the running speed of the prime vehicle based on the gearshift lever position and the pushed distance of the accelerator pedal 45.

The player action data processor 5753 includes a timer 5753a which inhibits alteration of the transmission gear ratio for a specified period of time after it has been altered as a result of a preceding gear-shifting operation. The timer 5753a is set to perform a time-counting sequence only in automatic transmission mode. It begins to count when the transmission is shifted. In this case, the transmission gear ratio does not change for the specified period of time (e.g., one second) even when the player accelerates the prime vehicle by pressing down the accelerator pedal 45. This arrangement serves to provide smooth acceleration of the prime vehicle in accordance with the pushed distance of the accelerator pedal 45. If the running speed of the prime vehicle is equal to or less than a specified value (e.g., 10 km/hour), the timer 5753a is deactivated even when it has been set to perform a time-counting sequence as a result of a gear-shifting operation.

The engine speed calculator 5754 determines the revolving speed of the simulated engine based on such data as the primary vehicle's running speed received from the player action data processor 5753 and outputs resultant data to the player action data processor 5753. The player action data processor 5753 performs a predefined data processing operation using this data.

The accelerator pedal pushing speed detector 5755 determines the accelerator pedal pushing speed based on player action data fed from the accelerator pedal 45 and outputs resultant data to the player action data processor 5753. The player action data processor 5753 performs a predefined data processing operation using this data.

Referring now to the flowcharts of FIGS. 15 to 18 in association with FIGS. 8, 12 and 14, operation of the driving game machine is further described.

Figure 15:
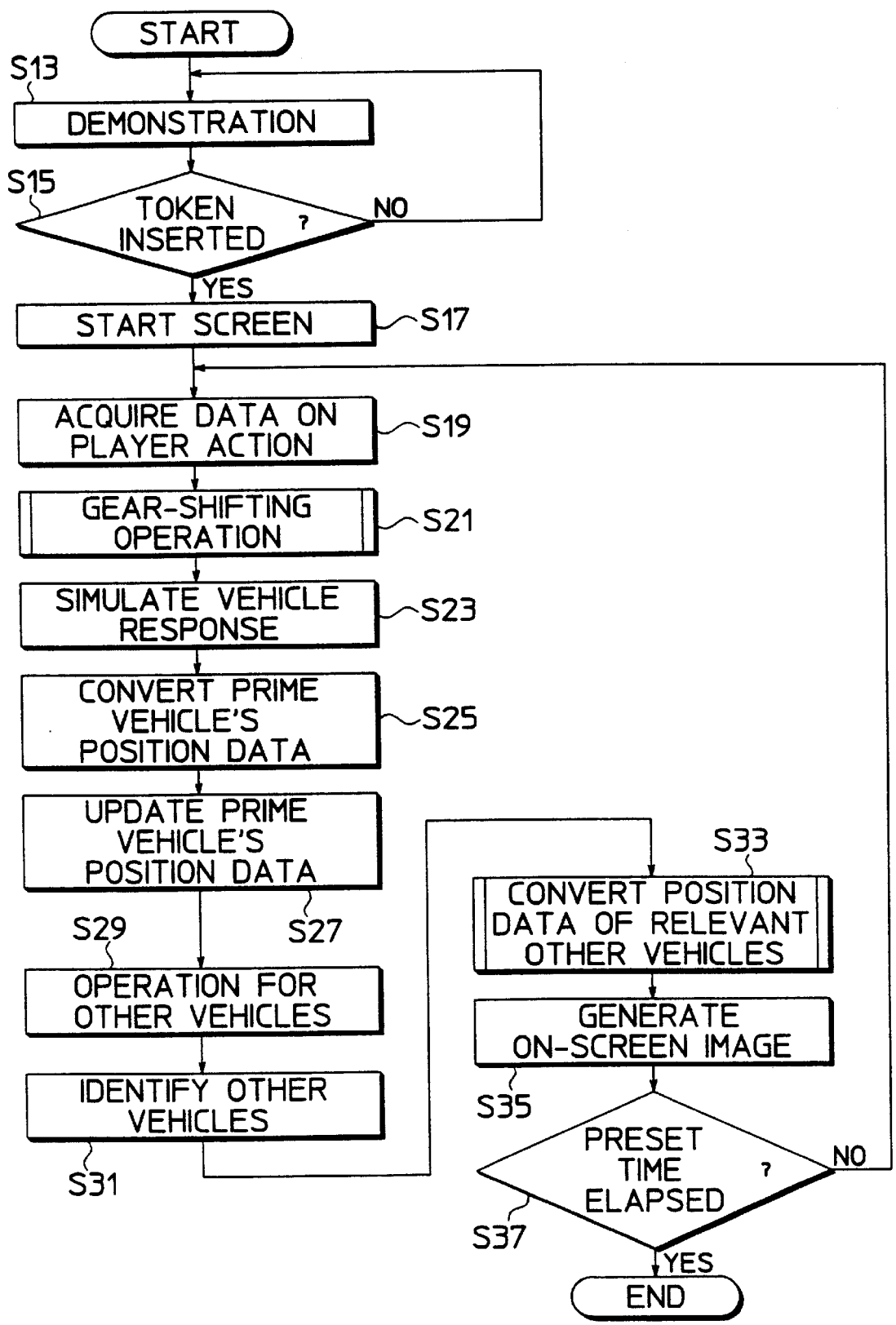
FIG. 15 is a flowchart showing an operational sequence of the driving game machine.

FIG. 15 is a flowchart showing an operational sequence of the driving game machine according to the invention.

When the driving game machine is switched on, the monitor 41 presents a demonstration picture generated by the image generation processor 576 (Step S13). Next, it is judged whether the player has inserted a token into the token slot 48 (Step S15). If the judgment result is in the negative (No in Step S15), the monitor 41 continues to present the demonstration picture. If the judgment result is in the affirmative (Yes in Step S15), the image generation processor 576 displays a startup screen on the monitor 41 (Step S17). A game begins as soon as the startup screen is erased, and the player drives the prime vehicle by operating various controls provided in the cockpit 42.

Data on various player actions are sent from the player input block 54 to the prime vehicle controller 575 (Step S19) and a later-described gear-shifting operation in manual or automatic transmission mode is performed (Step S21). The prime vehicle's response is then simulated in accordance with the automotive engineering based program stored in the ROM 55 using the data on various player actions fed from the player input block 54 and current gearshift lever position data (Step S23). Coordinate data on the prime vehicle's current position obtained in Step S23 is converted into data for the course coordinate system by the course coordinate system converter 573 (Step S25).

Subsequently, the prime vehicle's position data in the position determiner 579 is updated (Step S27) and the other vehicle controller 577 performs an operation for controlling movements of the other vehicles in accordance with their positional relationships and the judgment result of the interfering vehicle identifier 578 (Step S29). The position determiner 579 identifies other vehicles which come into the prime vehicle's visual field (Step S31) and the world coordinate system processor 574 converts position data of such other vehicles from the course coordinate system to the world coordinate system in accordance with a later-described sequence (Step S33).

The image generation processor 576 produces a three-dimensional image as viewed from the prime vehicle using the position data of the other vehicles converted to the world coordinate system and the prime vehicle's position and orientation determined in Step S23 by simulation of vehicle behaviors and causes t he monitor 41 to present such an image (Step S35). It is then judged whether a preset period of time has elapsed from the beginning of the game (Step S37). If the p reset period of time has not elapsed yet (No in Step S37), the operation flow returns to Step S19 and the same operations (Steps S19 to S37) are repeated. If the preset period of time has elapsed (Yes in Step S37), the operational sequence of FIG. 15 is finished.

The sequence of Steps S19 to S37 is repeated at a rate of 30 times a second.

Figure 16:
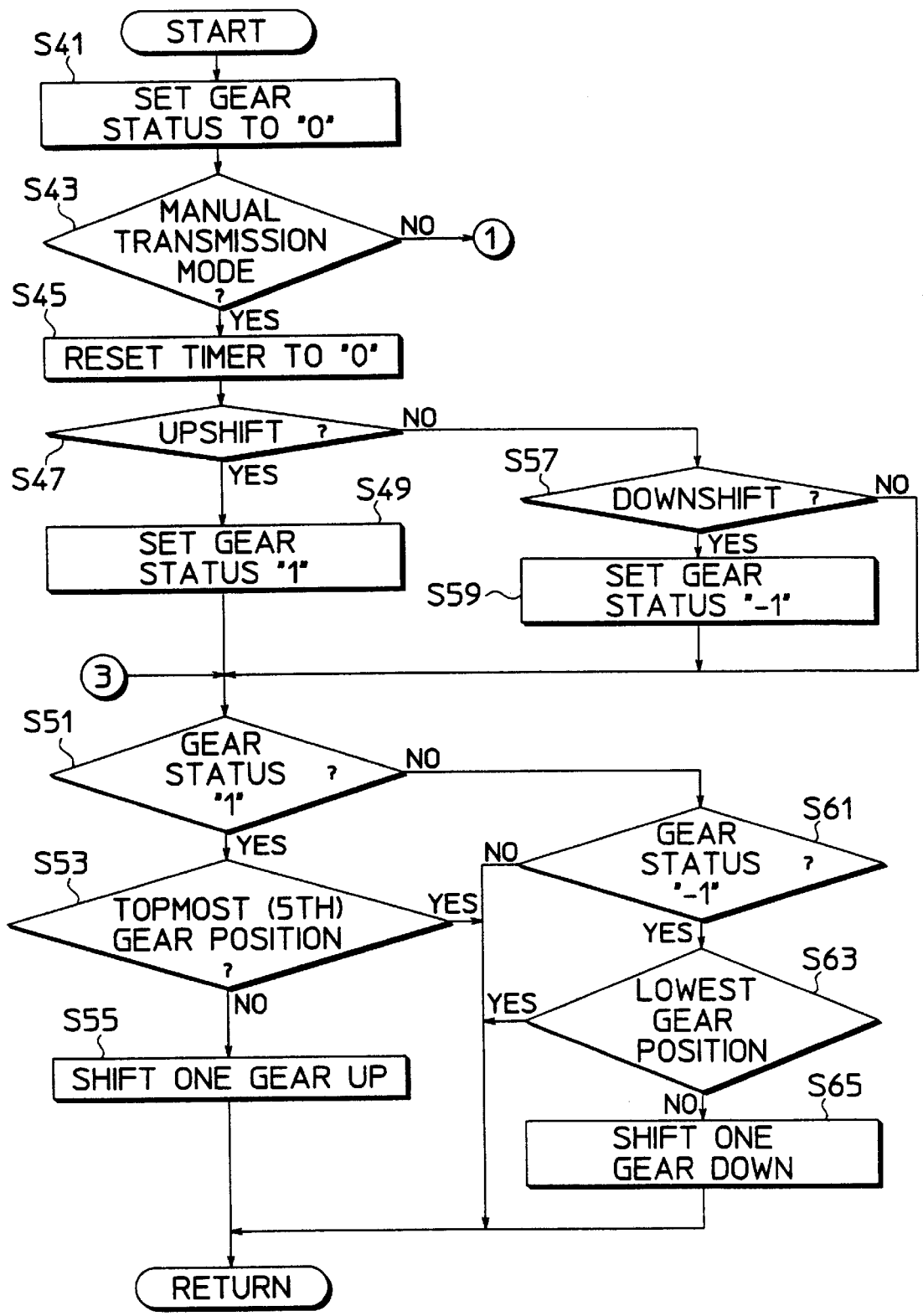
FIG. 16 is a flowchart showing a first part of a subroutine of Step S21 of FIG. 15.
Figure 17:
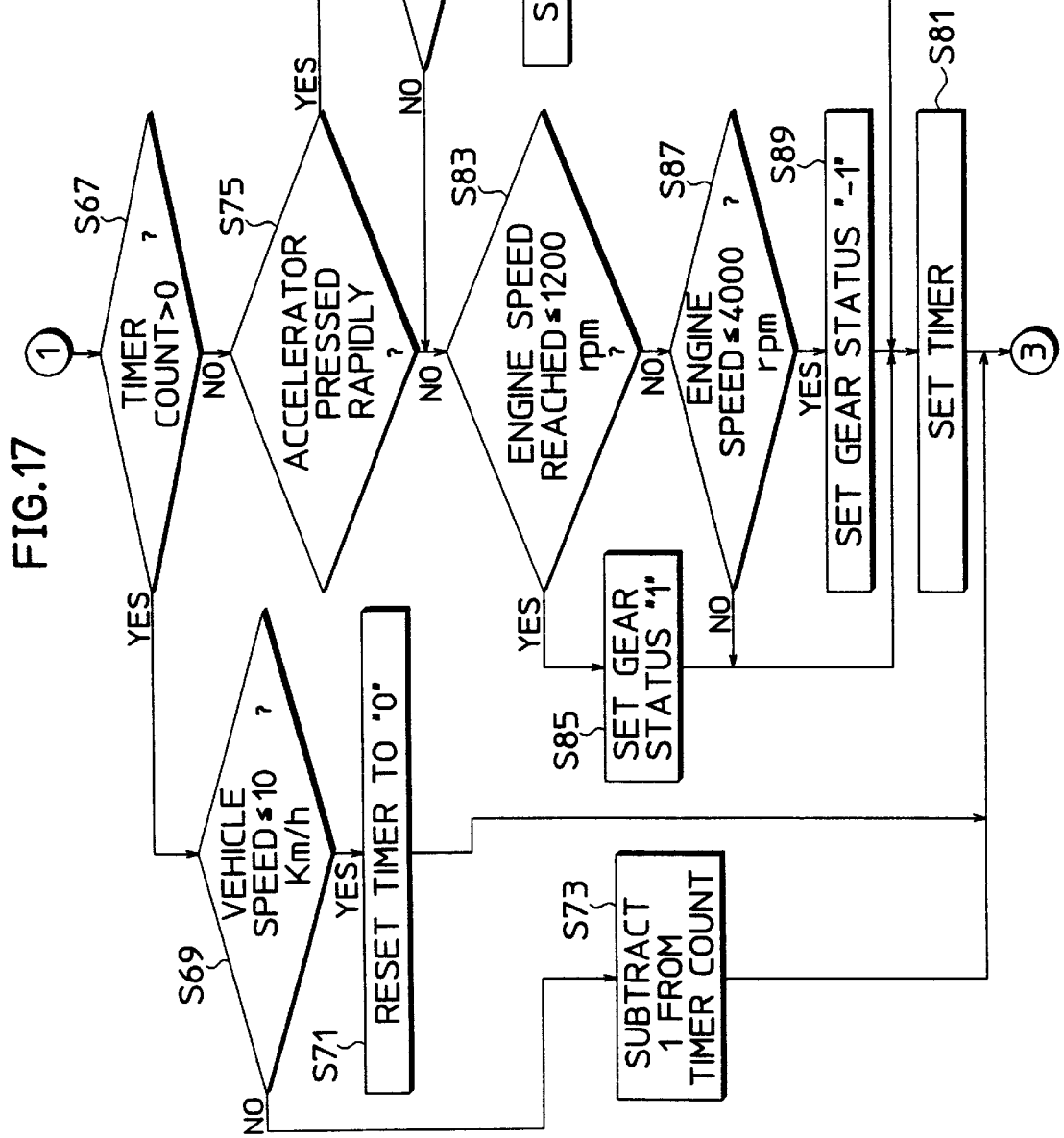
FIG. 17 is a flowchart showing a second part of the subroutine of Step S21 of FIG. 15.

FIGS. 16 and 17 are flowcharts showing, a subroutine of Step S21 of FIG. 15.

After setting, the gear status to "0" to maintain the current transmission gear position at the beginning (Step S41), it is judged whether manual or automatic transmission mode is currently selected (Step S43). If manual transmission mode is currently selected (Yes in Step S43), the timer 5753a is deactivated even when it is set to perform a time-counting sequence (Step S45).

Next, it is judged whether upshift data has been outputted from the gearshift lever 47 (Step S47). If the upshift data has been outputted (Yes in Step S47), upshift gear status information is generated (Step S49). It is then judged whether the upshift gear status information has been generated (Step S51). If the judgment result is in the positive (Yes in Step S51), it is further judged whether the transmission is currently in the topmost (fifth) gear position (Step S53). In Step S55, the transmission is maintained at the topmost (fifth) gear position if it is already there (Yes in Step S53) while the transmission is shifted one gear up if it is not at the topmost (fifth) gear position at present (No in Step S53).

If the upshift data has not been outputted (No in Step S47), it is judged whether downshift data has been outputted from the gearshift lever 47 (Step S57). If the downshift data has been outputted (Yes in Step S57), downshift gear status information is generated (Step S59). It is then judged whether the upshift gear status information has been generated (Step S51). If the judgment result is in the negative (No in Step S51), it is judged whether the downshift gear status information has been generated (Step S61). If the judgment result is in the positive (Yes in Step S61), it is further judged whether the transmission is currently in the lowest (first) gear position (Step S63). In Step S65, the transmission is maintained at the lowest (first) gear position if it is already there (Yes in Step S63) while the transmission is shifted one gear down if it is not at the lowest (first) gear position at present (No in Step S63).

If automatic transmission mode is currently selected (No in Step S43), it is judged whether the timer 5753a is set to perform a time-counting sequence (Step S67). If the timer 5753a is set to perform a time-counting sequence (Yes in Step S67), it is judged whether the prime vehicle's running speed is equal to or less than 10 km/hour (Step S69). If the prime vehicle's running speed is equal to or less than 10 km/hour (Yes in Step S69), the timer 5753a is reset to "0" (Step S71). If the prime vehicle's running speed exceeds 10 km/hour (No in Step S69), 1 (1/30 second) is subtracted from the current count value of the timer 5753a is (Step S73). If the timer 5753a is not set to perform a time-counting sequence (No in Step S67), it is judged whether the player has pressed down the accelerator pedal 45 in a rapid motion (Step S75). If the player has rapidly pressed down the accelerator pedal 45 (Yes in Step S75), it is further judged whether the prime vehicle's engine speed is equal to or less than 6000 r.p.m. (Step S77). If the prime vehicle's engine speed is equal to or less than 6000 r.p.m. (Yes in Step S77), downshift gear status information (kick-down information) is generated (Step S79) and the timer 5753a is set to perform a time-counting sequence (Step S81). The operation flow then proceeds to earlier-described Step S63 by way of Steps S51 and S61. In Step S63, it is judged whether the transmission is currently in the lowest (first) gear position. In Step S65, the transmission is maintained at the lowest (first) gear position if it is already there (Yes in Step S63) while the transmission is shifted one gear down if it is not at the lowest (first) gear position at present (No in Step S63).

If the player has not rapidly pressed down the accelerator pedal 45 (No in Step S75), it is judged whether the prime vehicle's wheels are not spinning and the engine speed has reached a point 1200 r.p.m. below a red zone (Step S83). If the prime vehicle's engine speed has reached the point 1200 r.p.m. below the red zone without spinning of wheels (Yes in Step S83), upshift gear status information is generated (Step S85) and the timer 5753a is set to perform a time-counting sequence (Step S81). The operation flow then proceeds to earlier-described Step S55 by way of Steps S51 and S53. In Step S53, it is judged whether the transmission is currently in the topmost (fifth) gear position. In Step S55, the transmission is maintained at the topmost (fifth) gear position if it is already there (Yes in Step S53) while the transmission is shifted one gear up if it is not at the topmost (fifth) gear position at present (No in Step S53).

If the prime vehicle's engine speed has not reached the point 1200 r.p.m. below the red zone (No in Step S83), it is further judged whether the engine speed is equal to or less than 4000 r.p.m. (Step S87). If the prime vehicle's engine speed is equal to or less than 4000 r.p.m. (Yes in Step S87), downshift gear status information is generated (Step S89) and the timer 5753a is set to perform a time-counting sequence (Step S81). The operation flow then proceeds to earlier-described Step S63 by way of Steps S51 and S61. In Step S63, it is judged whether the transmission is currently in the lowest (first) gear position. In Step S65, the transmission is maintained at the lowest (first) gear position if it is already there (Yes in Step S63) while the transmission is shifted one gear down if it is not at the lowest (first) gear position at present (No in Step S63). If the prime vehicle's engine speed exceeds 4000 r.p.m. (No in Step S87), the transmission is maintained at the current gear position.

Figure 18:
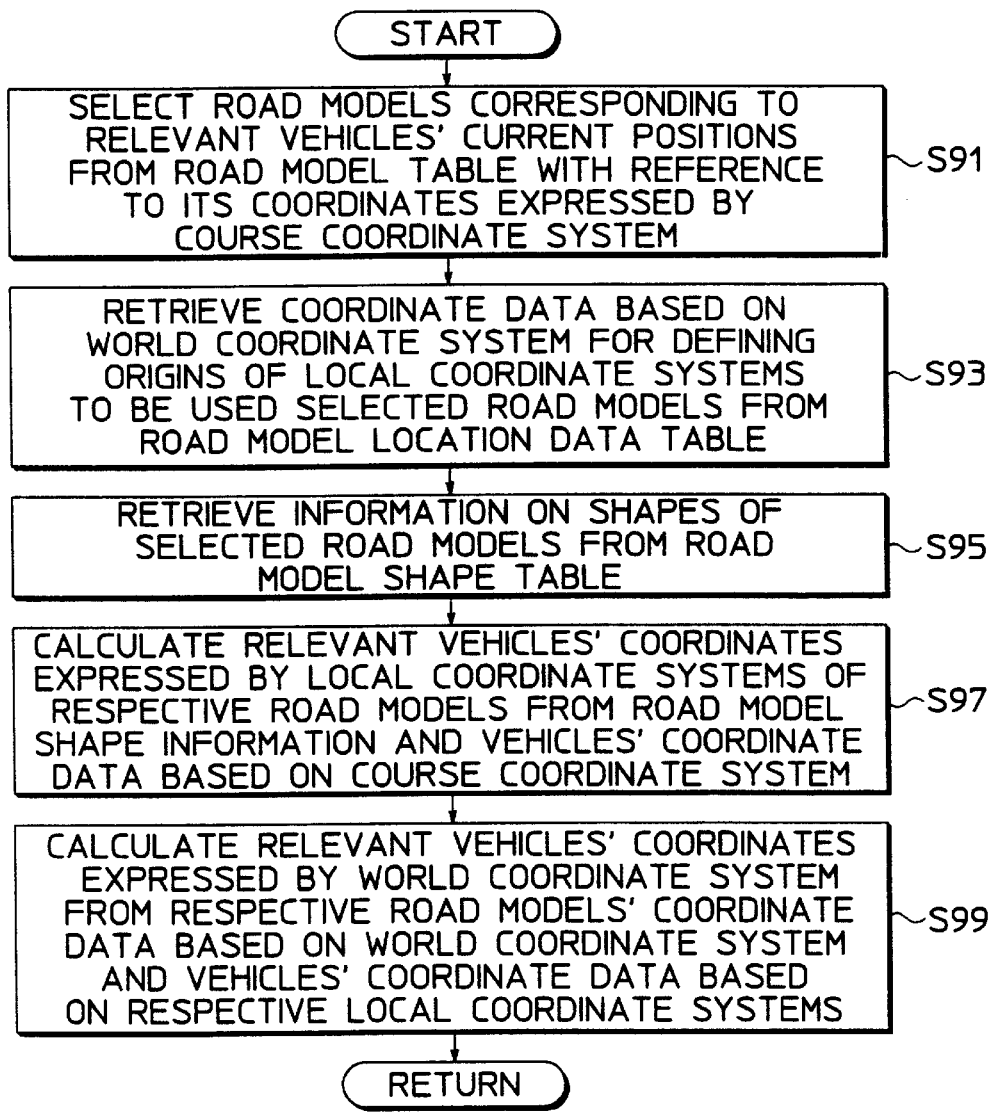
FIG. 18 is a flowchart showing a subroutine of Step S33 of FIG. 15.
Figure 19:
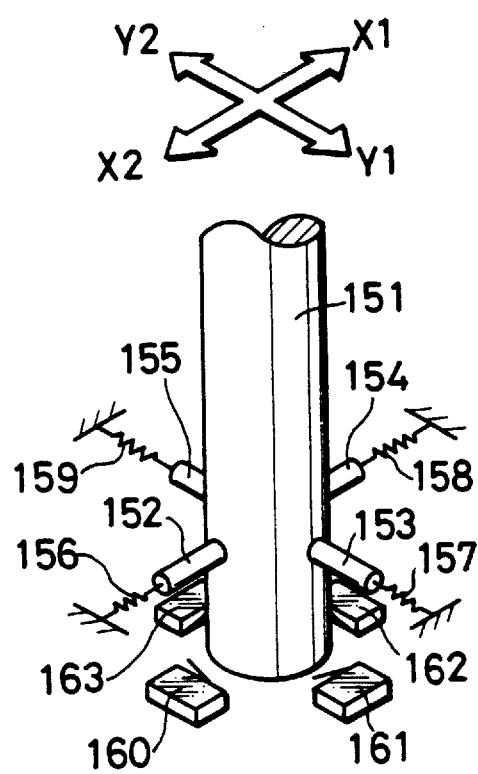
FIG. 19 is a fragmentary perspective diagram of a conventional multidirectional switch.

FIG. 18 is a flowchart showing a subroutine of Step S33 of FIG. 15.

First, road models corresponding to relevant vehicles' current positions are selected from Table 1 below with reference to the vehicle's coordinates expressed by the course coordinate system (Step S91).

TABLE 1

| Distance (m) | Road model |
|---|---|
| 0–100 | ① |
| 100–150 | ② |
| 150–200 | ③ |
| 200–230 | ④ |
| 230–400 | ⑤ |
| 400–500 | ⑥ |
| ⋮ | ⋮ |

Table 1 above shows a part of the road model table stored in the ROM 55. The road model table defines relationships between various road models and y-coordinates of the course coordinate system used for describing the straight roadway 520 shown in FIG. 11.

Referring to a road model location data table shown in Table 2 below, coordinate data based on the world coordinate system for defining the origin of each local coordinate system is retrieved (Step S93). The local coordinate systems thus established are used for describing shapes of the road models selected in Step S91.

Table 2 shows a part of the road model location data table stored in the ROM 55. The road model location data table defines relationships between a local coordinate system used for describing the shape of each individual road model and the world coordinate system.

TABLE 2

| Road model | Origin location in world coordinate system |
|---|---|
| ① | X1, Y1, Z1 |
| ② | X2, Y2, Z2 |
| ③ | X3, Y3, Z3 |
| ④ | X4, Y4, Z4 |
| ⑤ | X5, Y5, Z5 |
| ⑥ | X6, Y6, Z6 |
| ⋮ | ⋮ |

Referring next to a road model shape table shown in Table 3 below, information on the shapes of the road models selected in Step S91 is retrieved (Step S95).

TABLE 3

| Road model | No. of lanes | Shape | Center of curvature | Radius of curvature |
|---|---|---|---|---|
| ① | 4 | Straight | — | — |
| ② | 4 | Left turning curve | (x2, y2, z2) | r2 |
| ③ | 4 | Straight | — | — |
| ④ | 4 | Right turning curve | (x4, y4, z4) | r4 |
| ⑤ | 4 | Straight | — | — |
| ⑥ | 4 | Left turning curve | (x6, y6, z6) | r6 |
| ⋮ | ⋮ | ⋮ | ⋮ | ⋮ |

Table 3 above shows part of the road model shape table stored in the ROM 55. The road model shape table provides information on the configuration of each road model. The information defines the number of lanes and the shape (straight, left or right turning curve) of each road model. The information includes the center of curvature and the radius of curvature of each turning road model expressed by the relevant local coordinate system.

Subsequently, the relevant vehicles' coordinates expressed by the local coordinate systems of the respective road models are calculated from the road model shape information obtained in Step S95 above and the vehicles' coordinate data based on the course coordinate system (Step S97).

The relevant vehicles' coordinates expressed by the world coordinate system are calculated from the respective road models' coordinate data based on the world coordinate system obtained in Step S93 above and the vehicles' coordinate data based on the respective local coordinate systems obtained in Step S97 above (Step S99).

The subroutine of FIG. 18 may include an operation which, when converting coordinate data from the course coordinate system to the world coordinate system, causes vehicles on outer lanes to slightly accelerate and vehicles on inner lanes to slightly decelerate at curves of the closed track 52. This arrangement would serve to compensate for differences between inner and outer lane lengths of the closed track 52.

Referring to FIG. 10, the closed track 52 may be divided into segmental road models of the same length. In this case, road models can be selected more easily in Step S91.

Described below is a modified form of the preferred embodiment that would enable two players to compete interactively in a driving game.

In this embodiment, a pair of driving game machines shown in FIG. 8 are interconnected to each other with a communication cable and the control system of each driving game machine comprises a communications controller 58 which is shown by dot-and-dash lines in FIG. 12 in addition to the elements provided to the driving game machine of the earlier-described preferred embodiment.

The communications controller 58 of one driving game machine transmits coordinate data of its prime vehicle's current position converted by the course coordinate system converter 573 to the other driving game machine. Also, the communications controller 58 of one driving game machine receives current position coordinate data expressed by the course coordinate system of the other driving game machine's prime vehicle (hereinafter referred to as the competing vehicle), and transfers the received coordinate data to the position determiner 579.

In this embodiment, the position determiner 579 additionally determines positional relationships between the prime vehicle and the competing vehicle and between the other vehicles and the competing vehicle. The position determiner 579 also judges whether the competing vehicle is situated within the visual field of the prime vehicle. When the position determiner 579 judges that a collision has occurred between the prime vehicle and competing vehicle, it transmits a collision signal to the image generation processor 576.

The interfering vehicle identifier 578 additionally examines if the competing vehicle is traveling in the same lane with and in front of a particular vehicle chosen from all the vehicles other than the prime vehicle. The world coordinate system processor 574 additionally converts position coordinates of the competing vehicle from the course coordinate system to the world coordinate system if the position determiner 579 judges that the competing vehicle falls within the prime vehicle's visual field. In addition, the image generation processor 576 presents an image of the competing vehicle on the monitor 41 based on its position coordinates converted into the world coordinate system.

As seen above, the driving game machines of this modified form of the preferred embodiment each comprise the communications controller 58 for exchanging prime vehicle with each other. This arrangement allows two players to compete in the same roadway, making it more enjoyable and exiting to play a driving game.

The position determiner 579 can easily and quickly determine positional relationships between the prime vehicle and competing vehicle and determine whether the competing vehicle falls within the prime vehicle's visual field. This is because the position determiner 579 handles position data of the competing vehicle using the two-dimensional course coordinate system as is the case with the other vehicles.

In the modified form of the preferred embodiment, more than two driving game machines may be interconnected one another to increase the number of competing vehicles so that it will become even more enjoyable and exiting to play a driving game.

The communications controller 58 may be constructed to transmit the prime vehicle's position data expressed by the world coordinate system and receive the competing vehicle's position data expressed by the world coordinate system. In this variation, the course coordinate system converter 573 should convert the position data of both the prime vehicle and competing vehicle to the course coordinate system and transmit resultant coordinate data to the position determiner 579.

In another variation, there may be provided a common control block for controlling a plurality of driving game machines that are interconnected with each other, instead of providing the control block 57 in each driving game machine. In this variation, the communications controller 58 is not required but there should be provided a world coordinate system processor 571 for each driving game machine. The common control block should include a course coordinate system processor 572, a course coordinate system converter 573 and a world coordinate system processor 574 which carry out judgments, coordinate conversion and so on in the same manner as previously described.

In the aforementioned preferred embodiment, the monitor 41 presents the startup screen when a token is inserted into the token slot 48; then, a driving game begins automatically. In yet another variation of the embodiment, there may be provided a start switch in the cockpit 42 and the driving came machine may be controlled in such a way that a driving game begins when a player pressed the start switch after the monitor 41 has presented the startup screen.

The multidirectional switch used in the above-described driving game machine provides different types of information depending on whether its lever 1 is operated in the X- or Y-axis direction. The player can select whether to play in manual or automatic transmission mode so that driving games become highly enjoyable.

In the driving game machine using the multidirectional switch, movements of the vehicles other than the prime vehicle are controlled by using the imaginary straight roadway 520 defined by a two-dimensional coordinate system which corresponds to the closed track 52 defined by a three-dimensional coordinate system. This approach serves to increase the number of other vehicles that can be controlled simultaneously and provide more fun in playing a driving game. Positional relationships between the prime vehicle and other vehicles are easily determined by using coordinates on the imaginary straight roadway 520 which is defined by the two-dimensional coordinate system. This also facilitates detection of minor and major collisions between the prime vehicle and other vehicles.

Also in the driving game machine using the multidirectional switch, the prime vehicle controller 575 includes the timer 5753a which is set to perform a time-counting sequence only in automatic transmission mode for inhibiting alteration of the transmission gear ratio for a specified period of time after it has been once altered. Since the transmission gear ratio is altered in accordance with the subroutine shown in FIGS. 16 and 17, the player can switch between manual and automatic transmission modes even when a driving game is in progress. It is to be recognized that limit values of the prime vehicle's running speed and engine speeds are not limited to those shown in FIG. 17. These may take any values appropriate for ensuring smooth running performance of the prime vehicle in the light of automotive engineering technology.

What is claimed is:

1. A multidirectional switch comprising:

a lever;

a lever support for supporting the lever, the lever being slantable either in a direction of a first axis and a direction of a second axis intersecting the first axis;

an automatic lever reset mechanism for automatically returning the lever from a slant position to a neutral position;

a retainer for retaining the lever in a position slanted in the first or second axial direction against restoration force exerted by the automatic lever reset mechanism; and a sensor arranged at each of slant positions of the lever.

2. A multidirectional switch as defined in claim 1, the retainer includes:

a locking member operatively connected with the lever, the locking member having a snap-in portion and a fixing arm; and a catch having a pair of rollers which are normally pushed against each other;

the locking member being secured by the catch as the snap-in portion is seized by the pair of rollers.

3. A multidirectional switch as defined in claim 2, wherein:

the catch is mounted near a lower end of the lever; and the locking member is mounted by its fixing arm to one of the second pair of pivot shafts so that the snap-in portion is located near the catch.

4. A multidirectional switch as defined in claim 2, wherein the lever is slantable in either a positive or negative direction of the first axis and in only a positive direction of the second axis.

5. A driving game machine comprising a multidirectional switch of claim 4, the driving game machine capable of controlling a simulated vehicle displayed on a monitor and having a manual transmission mode and an automatic transmission mode, the manual transmission mode being selected when the lever is slanted in the positive or negative direction of the first axis, and the automatic transmission mode being selected when the lever is slanted in the positive direction of the second axis.

6. A multidirectional switch as defined in claim 1, wherein the lever support includes:

a lever holder for holding the lever;

a first pair of pivot shafts projecting in opposite directions from the lever holder;

a first shaft support for rotatably supporting the first pair of pivot shafts;

a second pair of pivot shafts projecting in opposite directions from the first shaft support; and a second shaft support for rotatably supporting the second pair of pivot shafts.

7. A multidirectional switch as defined in claim 6, wherein the automatic lever reset mechanism includes:

a first coil spring mounted around one of the first pair of pivot shafts for returning the lever holder to its neutral position when it is rotated; and a second coil spring mounted around one of the second pair of pivot shafts for returning the lever holder to its neutral position when it is rotated.

8. A multidirectional switch as defined in claim 7, wherein the retainer includes:

a locking member operatively connected with the lever, the locking member having a snap-in portion and a fixing arm; and a catch having a pair of rollers which are normally pushed against each other;

the locking member being secured by the catch as the snap-in portion is seized by the pair of rollers.

9. A multidirectional switch as defined in claim 8, wherein:

the catch is mounted near a lower end of the lever; and the locking member is mounted by its fixing arm to one of the second pair of pivot shafts so that the snap-in portion is located near the catch.

10. A multidirectional switch as defined in claim 9, wherein the lever is slantable in either a positive or negative direction of the first axis and in only a positive direction of the second axis.

11. A driving game machine comprising a multidirectional switch of claim 10, the driving game machine capable of controlling a simulated vehicle displayed on a monitor and having a manual transmission mode and an automatic transmission mode, the manual transmission mode being selected when the lever is slanted in the positive or negative direction of the first axis, and the automatic transmission mode being selected when the lever is slanted in the positive direction of the second axis.

12. A driving game machine as defined in claim 11, wherein the manual and automatic transmission modes are selectively switchable by altering the slanting position of the lever even when a game is in progress.

13. A driving game machine as defined in claim 10, further comprising a timer for inhibiting alteration of the transmission gear ratio for a specified period of time after it has been once altered, the timer being set to perform a time-counting sequence only in automatic transmission mode.

14. A multidirectional switch as defined in claim 7, wherein the lever is slantable in either a positive or negative direction of the first axis and in only a positive direction of the second axis.

15. A driving game machine comprising a multidirectional switch of claim 14, the driving game machine capable of controlling a simulated vehicle displayed on a monitor and having a manual transmission mode and an automatic transmission mode, the manual transmission mode being selected when the lever is slanted in the positive or negative direction of the first axis, and the automatic transmission mode being selected when the lever is slanted in the positive direction of the second axis.

16. A multidirectional switch as defined in claim 1, wherein the lever is slantable in either a positive or negative direction of the first axis and in only a positive direction of the second axis.

17. A driving game machine comprising a multidirectional switch of claim 16, the driving game machine capable of controlling a simulated vehicle displayed on a monitor and having a manual transmission mode and an automatic transmission mode, the manual transmission mode being selected when the lever is slanted in the positive or negative direction of the first axis, and the automatic transmission mode being selected when the lever is slanted in the positive direction of the second axis.

18. A driving game machine as defined in claim 17, wherein the manual and automatic transmission modes are selectively switchable by altering the slanting position of the lever even when a game is in progress.

19. A driving game machine as defined in claim 18, further comprising a timer for inhibiting alteration of the transmission gear ratio for a specified period of time after it has been once altered, the timer being set to perform a time-counting sequence only in automatic transmission mode.

20. A driving game machine as defined in claim 19, wherein the timer is deactivated if the running speed of the simulated vehicle is equal to or less than a specified value.

* * * * *